United States Patent
Davis et al.

(10) Patent No.: US 6,671,586 B2
(45) Date of Patent: Dec. 30, 2003

(54) SYSTEM AND METHOD FOR CONTROLLING POWER DEMAND OVER AN INTEGRATED WIRELESS NETWORK

(75) Inventors: James Davis, Woodstock, GA (US); Thomas D. Petite, Douglasville, GA (US)

(73) Assignee: StatSignal Systems, Inc., Atlanta, GA (US)

( * ) Notice: Subject to any disclaimer, the term of this patent is extended or adjusted under 35 U.S.C. 154(b) by 24 days.

(21) Appl. No.: 09/929,926

(22) Filed: Aug. 15, 2001

(65) Prior Publication Data

US 2003/0036822 A1 Feb. 20, 2003

(51) Int. Cl.$^7$ .................................................. G05D 3/12
(52) U.S. Cl. ...................................................... 700/295
(58) Field of Search .................................. 700/295, 286

(56) References Cited

U.S. PATENT DOCUMENTS

| | | | | |
|---|---|---|---|---|
| 4,190,800 A | * | 2/1980 | Kelly et al. | 340/310.02 |
| 4,977,515 A | * | 12/1990 | Rudden et al. | 700/296 |
| 5,576,700 A | * | 11/1996 | Davis et al. | 340/3.31 |
| 5,696,695 A | * | 12/1997 | Ehlers et al. | 700/286 |
| 5,714,931 A | | 2/1998 | Petite et al. | 340/539 |
| 5,926,103 A | | 7/1999 | Petite | 340/825.19 |
| 6,181,985 B1 | * | 1/2001 | O'Donnell et al. | 700/295 |
| 6,233,327 B1 | | 5/2001 | Petite | 379/155 |
| 2002/0138176 A1 | * | 9/2002 | Davis et al. | 700/286 |

OTHER PUBLICATIONS

U.S. Utility Patent Application entitled, "System for Monitoring Conditions in a Residential Living Community," filed on Mar. 18, 1999 and assigned Ser. No. 09/271,517.

* cited by examiner

Primary Examiner—Leo Picard
Assistant Examiner—Alexander Kosowski
(74) Attorney, Agent, or Firm—Thomas, Kayden, Horstemeyer & Risley, LLP

(57) ABSTRACT

An intelligent network demand control system provides a system and method for controlling demand in an energy delivery system. The intelligent network demand control system employs a transceiver network with a plurality transceivers coupled to meters and appliances residing at a plurality of customer premises. Control room operators instruct a customer premises (CP) energy management controller to implement a reduction in system demand. A demand reduction control signal is relayed out to a predefined group of transceivers to shut off their respective controlled appliances. The predefined transceivers, identified by their identification codes, are specified in the demand reduction control signal. When the transceivers shut off the appliances in response to a broadcasted demand reduction control signal, the actual demand reduction is metered and relayed back to the CP energy management controller. The total demand reduction is aggregated into a single number and then communicated to the operators.

93 Claims, 11 Drawing Sheets

SYSTEM AND METHOD FOR CONTROLLING POWER DEMAND OVER AN INTEGRATED WIRELESS NETWORK

BACKGROUND OF THE INVENTION

1. Field of the Invention

The present invention generally relates to controlling power demand in an electric power distribution system and, in particular, to a system and method for ordering power demand reductions at customer premises through an integrated wireless communication network.

2. Related Art

Electric utilities and other organizations are responsible for supplying an economic, reliable and safe source of electricity to customers. The electric utility or other responsible organization, through its energy delivery system, provides to its customers electricity at a suitable voltage and frequency. This electricity is provided on an instantaneous basis. That is, when the customer turns on the light switch to light a room, the electric utility or other responsible organization provides the electricity to the customer's light bulb the instant that the customer flips the light switch on.

One of the well known difficulties in providing electricity to customers is precisely matching the aggregate amount of electricity consumed by all of the customers on an instantaneous basis with the amount of electricity generated and/or purchased by the providing electric utility or other responsible organization. That is, at any instant in time, the electric utility or other responsible organization must provide exactly the amount of electricity used by all of the customers (plus the associated transmission system losses). The total amount of electricity used by all of the customers at any given instant in time is commonly referred to as demand. Demand typically is measured in units of watts, kilo-watts (kW), mega-watts (MW) or the like. For example, a conventional light bulb may have a demand of 60 watts. One thousand of these light bulbs has a demand of 6 kW. If all one thousand of these light bulbs are all turned on at the same instant in time, the electric utility or other responsible organization must instantly provide an additional 6 kW of electricity (in addition to any associated increases in transmission system losses) by increasing generation or purchases.

Failure by the electric utility or other responsible organization to exactly match the electric demand of their customers with the supply (generation and purchases), during every instant in time, may have very undesirable consequences should the mismatch become significant. When significant mismatches between demand and supply occur, distortions in the electric system frequency occurs. Although the electric system components are designed to operate when the electric frequency is slightly distorted, protective devices coupled to selected components in the electric system are designed to operate to automatically reduce or eliminate significant mismatches between demand and supply. Furthermore, other electricity characteristics may be undesirably distorted, such as voltage, such that other types of protective relays begin to operate.

For example, if the electric utility or other responsible organization loses a generator in an unplanned manner, the electric system demand will exceed supply (because the supply decreases when the generator shuts down). If the mismatch is sufficiently large, the electric frequency will decrease from its nominal value of 60 hertz (Hz). If the frequency drops to below 59.8 Hz, relays sense the frequency decay and operate to selectively disconnect predefined groups of customers from the energy delivery system. That is, power is shut off to some customers. Thus, demand is reduced, hopefully to the point where demand again approximately equals supply such that the frequency recovers back to its nominal 60 Hz value. Disconnecting customer loads to arrest frequency decay is known as load shedding.

Although the action of the frequency sensitive relays effectively arrests the undesirable frequency decay, thereby saving the energy delivery system from a more severe decay in frequency and other undesirable associated problems, those customers that were disconnected are impacted in an undesirable manner. That is, the customers who were selected to participate in the load shedding scheme had their power shut off. The affected customers are inconvenienced when they are disconnected from the energy delivery system, and the affected customers did not volunteer to be selected as participants in the load shedding scheme. Furthermore, the electric utility or other responsible organization loses the associated sales to the affected customers, thereby negatively impacting the electric utility's or other responsible organization's revenue stream.

Electric utilities and the other responsible organizations have implemented a variety of techniques to decrease the frequency of occurrence of these undesirable mismatches between energy demand and supply. One well known technique is to couple selected energy consuming appliances to radio frequency (RF) controlled receivers. Then, when a mismatch in demand and supply occurs, or when the electric utility or other responsible organization anticipates that a mismatch occurrence is eminent, the electric utility or other responsible organization orders the shut off of the selected energy consuming appliances by transmitting a shut-off signal via a RF signal to the RF receivers. Typically, a group of appliances are coordinated to respond to a single RF frequency or a single command delivered to the RF receivers. Such a group of aggregated appliances is commonly referred to as a load block. Thus, by issuing a single shut-off command, appliances in the entire load block can be shut off such that a meaningful decrease in demand occurs.

Participation in such a load block is typically voluntary. Often, customers are offered incentives to participate. For example, a customer can be given a decrease in rate and/or a rebate to voluntarily allow the utility or other responsible organization to couple an RF receiver to their appliance.

For example, a load block can be formed by coupling each one of the above described one thousand light bulbs to RF receivers such that a 6 kW demand reduction is realized (assuming that all of the light bulbs were on prior to sending the shut-off command). However, this is not a very effective technique for reducing demand. The 6 kW decrease in demand does not provide a meaningful demand reduction because the demand decrease is too small to be of practical help in matching demand of the entire system with supply. Also, the cost of the RF receivers is not likely justifiable for so little of a demand reduction.

On the other hand, forming a load block by connecting one hundred air conditioning units may provide a meaningful technique of reducing demand in a controlled manner. For example, if each air conditioning unit, when on, consumes approximately 10 kW, the electric utility or other responsible organization can reduce demand by as much as 1.0 MW. A 1.0 MW demand reduction is sufficiently large to make a meaningful reduction in system demand. Even if only a portion of the air conditioning units were on at the time the shut-off command was transmitted to the RF receivers, the demand reduction may still be sufficiently large to be meaningful.

Typically, electric utilities or other responsible organizations having such RF controlled energy demand reduction schemes will have a plurality of load blocks that can be selectively shut off depending upon the particular needs at hand. For example, a load block may be designed to provide an expected demand reduction of 5 MW. The system may have eight such blocks. At some point in time, the electric utility or other responsible organization may determine that a 5 MW demand reduction is needed for a two hour period. The eight load blocks would be sequentially shut off for fifteen minute intervals over the two hour period. Such an approach is desirable in that the negative impact to the customers will be minimized since the temperature of the customers' premises is not likely to become noticeably uncomfortable during the 15 minute period that their air conditioners are shut off.

Similarly, the electric utility or other responsible organization may determine that a 40 MW demand reduction is required for fifteen minutes, thereby providing sufficient time to increase generation or purchase additional power. All eight load blocks could be simultaneously shut off, thereby achieving a 40 MW demand reduction. One skilled in the art will appreciate the significant flexibility provided to the electric utility or other responsible organization having access to an energy demand reduction system employing a plurality of RF controlled load blocks.

However, such energy demand reduction systems employing a plurality of RF controlled load blocks have numerous problems and deficiencies. Once a load block is established by configuring an RF communication network to provide a unique shut-off signal, and after a sufficient number of selected appliances are fitted with RF receivers responsive to the shut-off signal, it is difficult to revise, update and/or modify the load block. If the shut off signal is modified or changed, each individual appliance RF receiver may have to be manually reconfigured. If the amount of the load in the load block is to be changed, individual appliances and/or their RF receivers would have to be added, removed and/or reconfigured on an individual basis. Such changes require the time of a trained technician. Technician time directly equates to an expense to the electric utility or other responsible organization. Furthermore, making significant changes to an established load block will take a considerable amount of time to implement.

Furthermore, there is no way to ascertain the failure of an RF receiver or the associated appliance control equipment. Thus, the shut-off signal sent out to the RF receivers would not have an effect on a failed RF receiver. Only during a manual inspection would the failed RF receiver be detected and fixed.

Another problem associated with conventional RF controlled load blocks arises from the statistical nature of loads serviced by an electric power distribution system. Consider the above described scenario where each one hundred air conditioning units are each in a different residence. During a hot summer day, it is not probable that all one hundred of the air conditioning units will be on all at the same time. An air conditioning unit cycles on and off as needed to maintain temperature of the house according to a temperature range specified by the thermostat in the house. Thus, at any given moment, some of the air conditioners will likely be on and some of the air conditioners will likely be off. Furthermore, the thermostat settings will not be the same for all of the residences. Statistics are used by the electric utility or other responsible organization to estimate, with a reasonable degree of accuracy, how many of the air conditioning units will likely be on at any given instant for an ambient temperature. Thus, the amount of load consumed by the aggregation of the one hundred air conditioners can be estimated. However, an estimate is not an exact number. The electric utility or other responsible organization cannot know with certainty exactly how much load is shut off when the shut-off signal is sent out to the RF receivers.

Another related problem arises from the nature in which the loads are metered (measured). Typically, aggregate customer loads are metered on a real-time basis by monitoring meters residing in the distribution substations. Thus, if the load block is serviced from a single substation (which is not very likely), the electric utility or other responsible organization may get a good approximation of the effect of shutting off the load block by closely monitoring the substation meters. However, other loads are coming on, and going off, at precisely the same time that the shut-off signal is communicated to the load block. So, the meter will, to some degree, falsely imply that shutting off the load block had more, or had less, of an impact than what was in fact achieved by shutting off the load block. For example, the shut-off signal may shut off seventy-five of the one hundred air conditioning units in the load block (twenty five units are not running at the instant that the shut-off signal is sent). However, five air conditioning units not part of the load block may cycle on at substantially the same time that the shut-off signal is transmitted to the load block (a probable event if the substation is providing service to a large number of homes on a hot day). The substation meter would incorrectly imply that only seventy air conditioning units were shut off, when in fact, seventy-five air conditioning units were shut off. Thus, the electric utility or other responsible organization may at best have a good approximation of the effectiveness of shutting off a load block. But, the electric utility or other responsible organization will not know the exact amount of demand reduction realized when the load block is shut off.

Yet another problem with demand reduction systems employing fixed-size load blocks is that it is difficult to readjust changes made in demand, or to fine-tune the demand changes actually realized. A load block is pre-configured to affect a predetermined number of customer appliances (which may or may not actually be operating at any given instant in time). Thus, a load block designed to statistically provide a 10 MW demand reduction cannot be easily reconfigured to provide a 12 MW demand reduction. Furthermore, if a 10 MW demand reduction is desired, the load block designed to statistically provide a 10 MW demand reduction will probably never provide exactly a 10 MW demand reduction. If, for example, the load block provides an actual load reduction of 9 MW, there is no convenient and effective mechanism to fine tune the energy demand reduction system or the load block such that an additional 1 MW demand reduction can be ordered.

Thus, a heretofore unaddressed need exists in the industry for providing a demand reduction and control system that accurately indicates the true amount of demand reduction realized when a shut-off signal is transmitted. Also, there is a heretofore unaddressed need in the industry to provide a demand reduction and control system that provides for real time adjustment of demand on an appliance-by-appliance basis. There is also a heretofore unaddressed need in the industry to automatically detect failure of RF receivers so that repairs can be initiated.

SUMMARY OF THE INVENTION

The present invention overcomes the inadequacies and deficiencies of the prior art as discussed hereinabove. One embodiment of the present invention, an intelligent network demand control system, provides a system and method for providing an electric utility or other responsible organization direct control over selected individual customer loads such that the controlled loads may be selectively shut off during periods of time when the electric utility or other responsible organization desires to reduce system demand. The intelligent network demand control system employs a transceiver network with a plurality of transceivers residing at a plurality of customer premises. A transceiver is coupled to each meter at a plurality of customer premises. Customer premises (CP) appliance controller units, each having a transceiver, are coupled to appliances residing in the plurality of customer premises. The transceivers and CP appliance controller units each have unique identification codes. In one embodiment, transceivers broadcast to and receive radio frequency (RF) signals. A site controller provides communications between the plurality of transceiver units and a CP energy management controller residing in an energy delivery system control center.

Transceivers coupled to the meters provide metered demand information to the site controllers such that the metered demand information is relayed onto the energy delivery system control center. Metered demand information from all customer premises transmitted into the transceiver network are aggregated and then communicated to the control room operators. When the control room operators determine that a reduction in system demand is required, the control room operators instruct the CP energy management controller to implement a demand reduction. The CP energy management controller provides control signals to the site controller specifying a plurality of appliances that are to be shut off, thereby effecting a demand reduction.

The demand reduction control signal issued by the CP energy management controller is relayed to the site controllers out to the plurality of transceiver units coupled to the appliances. In one embodiment, the transceivers are coupled to the power switches of the appliances such that when the transceivers receive the demand reduction control signal, the appliances are shut off. That is, when the control room operators instruct the CP energy management controller to implement a reduction in system demand, the CP energy management controller generates a demand reduction control signal which is relayed out to a plurality of predefined transceivers residing in the transceiver network that are configured to shut off their respective controlled appliances. This group of predefined transceivers is load block. The predefined transceivers are identified by their identification codes which are specified in the demand reduction control signal.

When the transceivers shut off the appliances, a change in demand is metered by the meters. Transceivers coupled to the meters detect the change in metered demand and transmit the information to the CP energy management controller. Thus, when a plurality of appliances are shut off in response to a broadcasted demand reduction control signal over the transceiver network, the actual demand reduction occurring at each customer premises is metered and the metered demand change is determined by the CP energy management controller on a real-time basis such that the total demand reduction is aggregated into a single number and then provided to the control room operators.

In one embodiment, the control room operators may review the total demand reduction realized and may then, if desired, instruct the CP energy management controller to implement a second round of demand reduction by issuing a second demand reduction control signal out to another load block (plurality of pre-defined appliances).

In another embodiment, the CP energy management controller may compare the initial total metered demand reduction with a specified demand reduction, and if the initial demand reduction is less than the specified demand reduction, the CP energy management controller automatically initiates a second round of demand reductions. With this alternative embodiment, if the initial demand reduction exceeds the specified demand reduction, the CP energy management controller would issue a control signal out to selected transceivers allowing their appliances to re-power, thereby fine tuning the actual demand reduction to be substantially equal to the specified demand reduction requested by the control room operators.

The present invention can also be viewed as providing a method for controlling demand in an energy delivery system. In one embodiment, the method includes the steps of generating a demand reduction control signal from the energy management controller to at least one of a plurality of demand reduction control signal by an energy management controller; transmitting the demand reduction control signal from the energy management controller to at least one of a plurality of appliance control units, each one of the plurality of appliance control units coupled to at least one appliance; shutting off the appliance coupled to the appliance control unit in response to receiving the demand reduction control signal; metering a first change in demand at a plurality of meters, each one of the meters coupled to the appliance that is coupled to one of the appliance control units; and determining a first aggregate change in demand.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION a. Overview of the Intelligent Network Demand Control System In general, the present invention relates to a system and method for providing an electric utility or other responsible organization direct control over selected customer loads such that the controlled loads are selectively shut off during periods of time when the electric utility or other responsible organization desires to reduce system demand. System demand is defined herein to be the instantaneous amount of electricity, including customer loads and electric system transmission losses, that the electric utility or other responsible organization either generates or purchases to provide service to its customers. Customers are defined herein to include residential customers (individuals or families living in homes, apartments, condominiums or the like), retail customers (such as retail stores, shopping malls, small businesses or the like) and wholesale customers (such as manufacturers, producers or the like). Although the characteristics of residential customers, retail customers and wholesale customers are very different from each other, the intelligent network demand control system is designed to apply equally well to any customer class.

Figure 1:
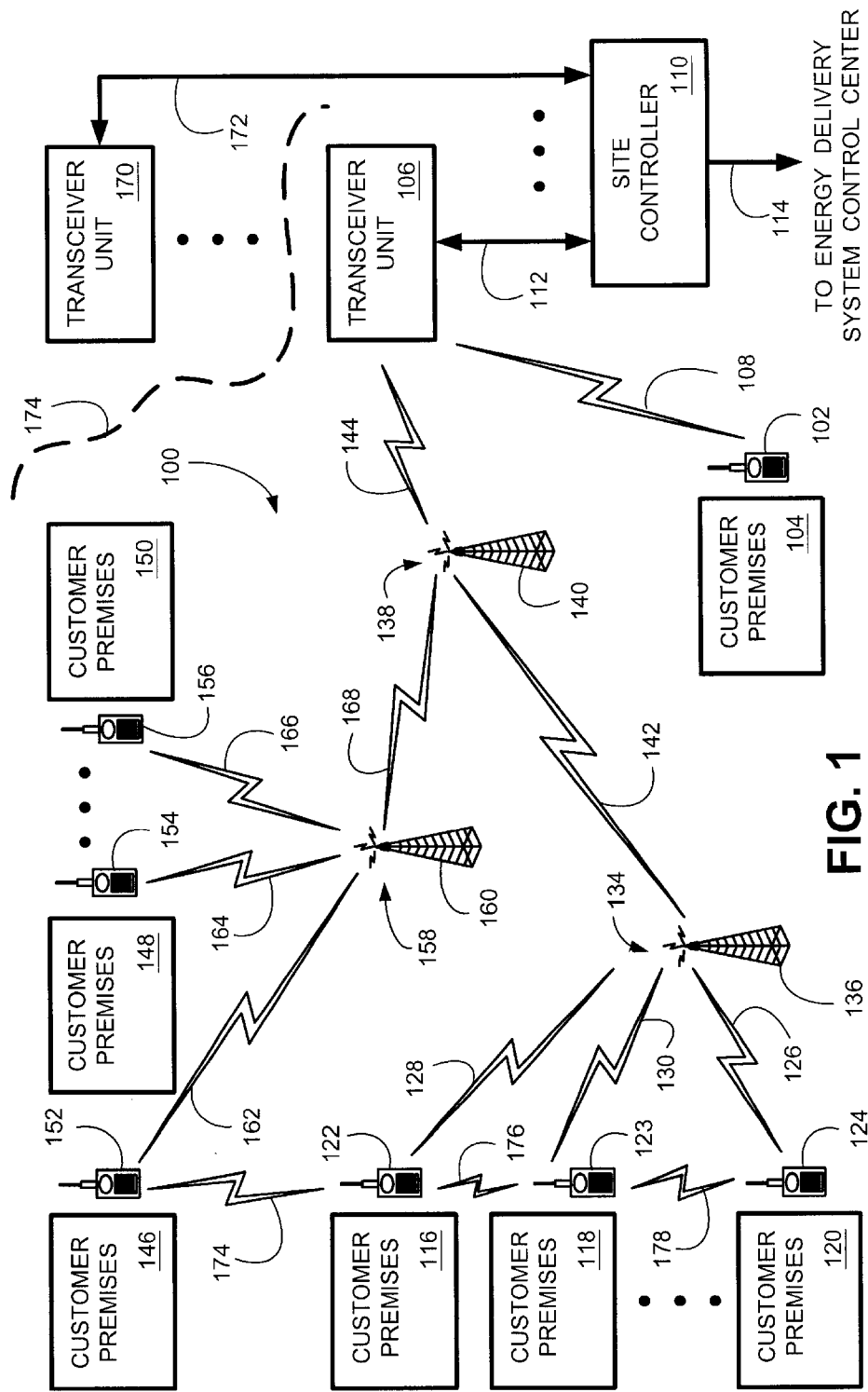
FIG. 1 is a block diagram illustrating a portion of a plurality transceivers residing at a plurality of customer premises.

FIG. 1 is a block diagram illustrating a portion of a transceiver network 100 having a plurality transceivers residing at a plurality of customer premises. A transceiver 102, described in detail below, is coupled to a meter (not shown) of the customer premises 104. Transceiver 102 broadcasts to and receives from the transceiver unit 106 radio frequency (RF) signals 108. The site controller 110 provides communications between the transceiver unit 106, via connection 112, and the energy delivery system control center 300 (FIG. 3), via connection 114.

Figure 2:
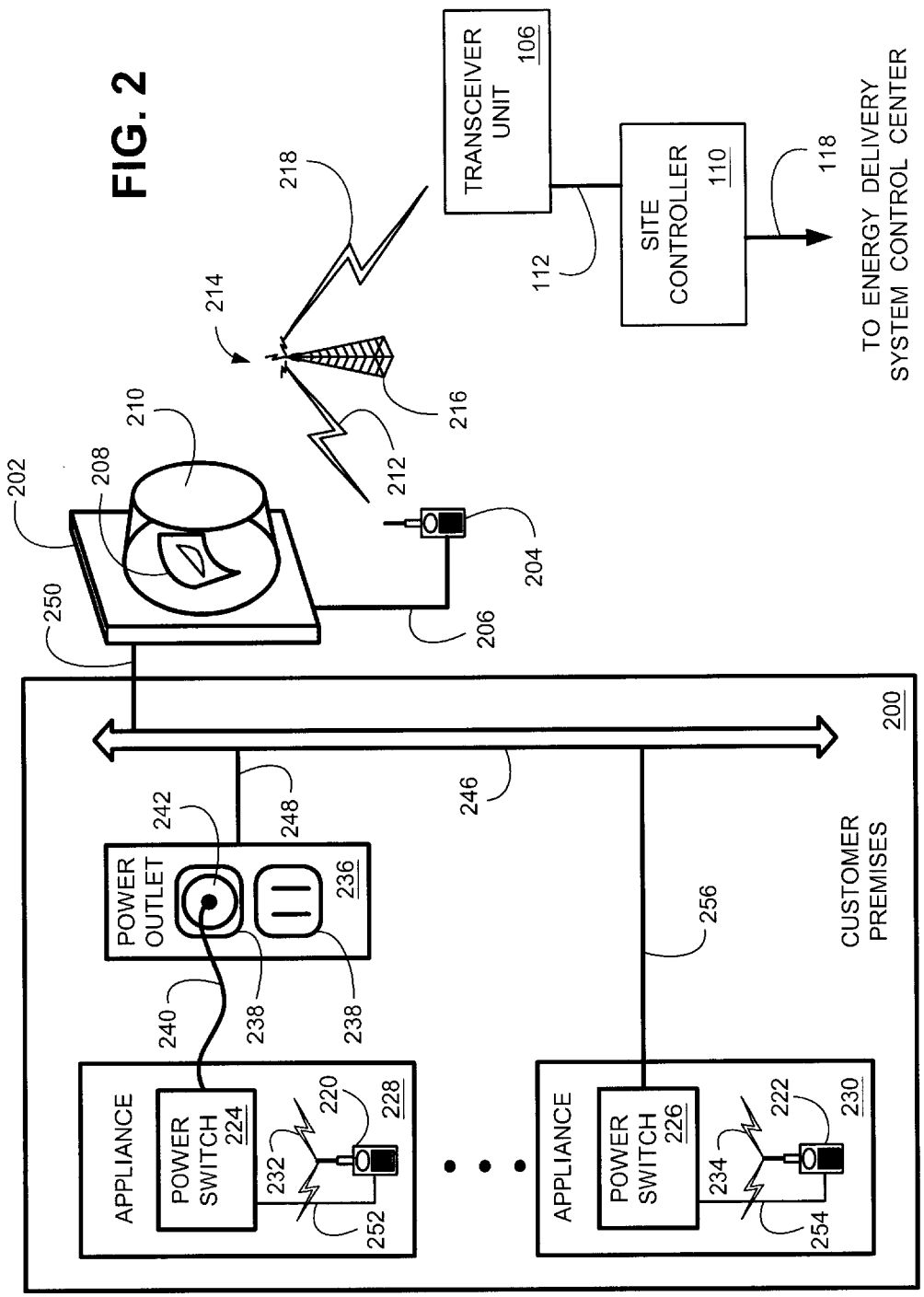
FIG. 2 is a block diagram illustrating selected transceivers residing in one of the exemplary customer premises of FIG. 1.

FIG. 2 is a block diagram illustrating selected transceivers residing in one of the exemplary customer premises of FIG. 1. The meter customer premises 200 includes a meter 202 that is coupled to the transceiver 204, via the connection 206. The meter 202, in one embodiment, is a conventional utility grade residential customer meter having a face plate 208 that is visible through the cover 210. However, trasceiver 204 may be configured to couple to any meter type.

Transceiver 204 detects actual instantaneous electrical usage (hereinafter defined as metered demand), that is metered by the meter 202. Transceiver 204 broadcasts RF signals 212 to a transceiver station 214 that would typically reside at a suitably elevated location, such as on tower 216. Transceiver station 214 transmits an RF signal 218 to the transceiver unit 106. The transceiver unit 106 provides the metered demand information to the site controller 110 such that the metered demand information is relayed on to the energy delivery system control center 300 (FIG. 3).

Figure 3:
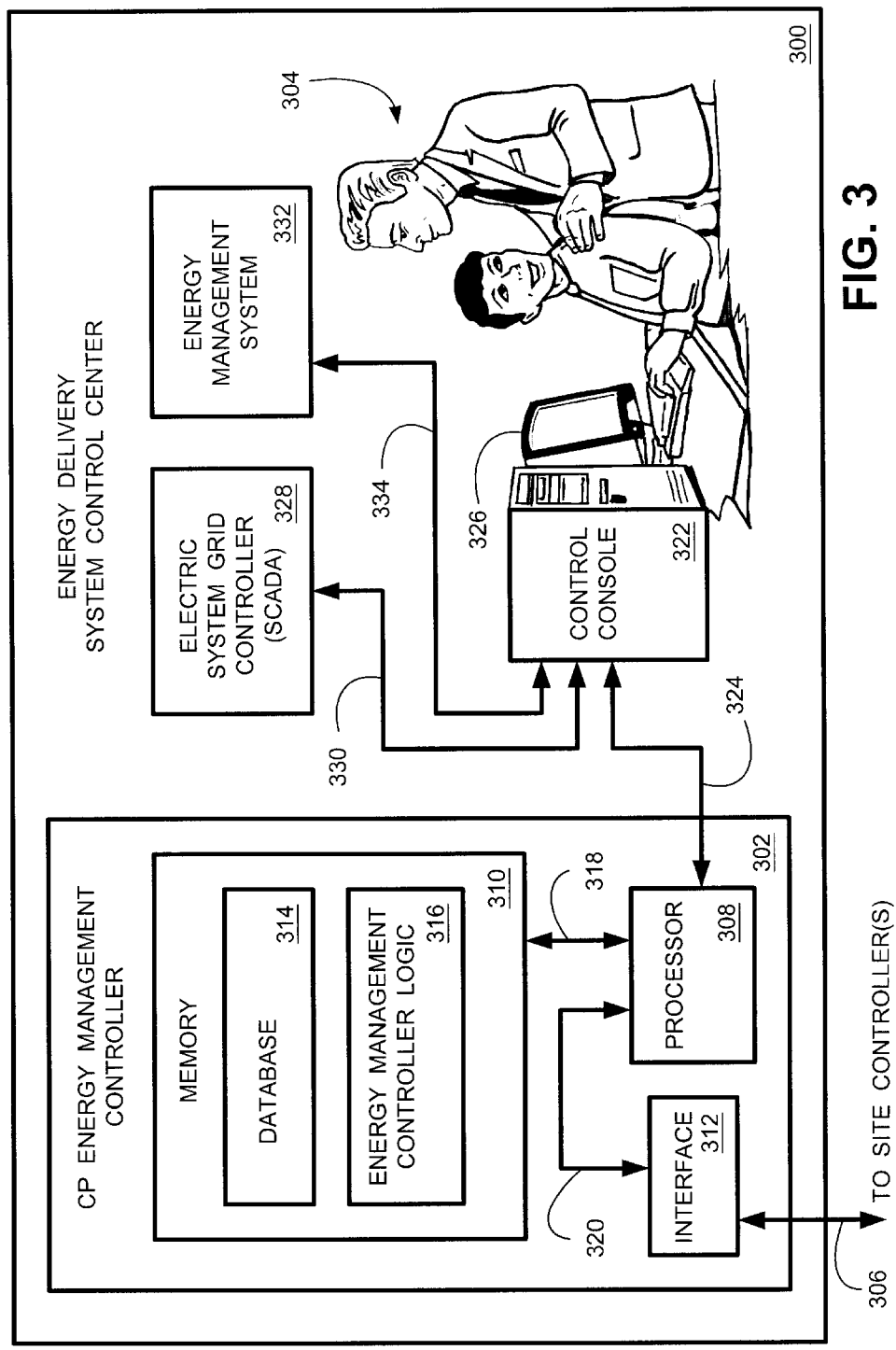
FIG. 3 is a block diagram illustrating selected components of an energy delivery system control center in communication with the transceiver network of FIG. 1.

FIG. 3 is a block diagram illustrating selected components of an energy delivery system control center 300 in communication with the transceiver network 100 (FIG. 1). The customer premises (CP) energy management controller 302 receives the metered demand information from the site controller 110 (FIGS. 1 and 2), via connection 306. Then metered demand information from all of the customer premises is aggregated and, in one embodiment, is then communicated to at least one of the control room operators 304.

The control room operators 304 are responsible for operation of the energy delivery system that is controlled by the electric utility or other responsible organization. When the control room operators 304 determine that a reduction in system demand is required, the control room operators 304 instruct the CP energy management controller 302 to implement a demand reduction. The CP energy management controller 302, in a manner described in detail below, provides control signals to the site controller 110 (FIGS. 1 and 2) specifying a plurality of appliances (a load block) that are to be shut off, thereby effecting a demand reduction.

A demand reduction control signal issued by the CP energy management controller 302 (FIG. 3) is relayed to the site controller 110 out to a plurality of transceiver units, such as the transceiver unit 106 (FIGS. 1 and 2). Transceiver unit 106, in a manner described in detail below, broadcasts an RF signal 218 to the transceiver station 214 (FIG. 2). In one embodiment, the transceiver station 214 relays the demand reduction control signal to the transceiver 204, which further relays the demand reduction control signal to the transceivers 220 and 222 that are coupled to the power switches 224 and 226 of the appliances 228 and 230, respectively. Alternatively, the transceiver station may be configured to relay the demand reduction control signal directly to the transceivers 220 and/or 222.

When the transceivers 220 and 222 receive the demand reduction control signal, via the RF signals 232 and 234, respectively, the appliances 228 and 230 are shut off. That is, when the control room operators 304 instruct the CP energy management controller 302 (FIG. 3) to implement a reduction in system demand, the CP energy management controller 302 generates a demand reduction control signal which is relayed out to a plurality of transceivers residing in the transceiver network 100 (FIG. 1) that are configured to shut off their respective controlled appliances.

When the transceivers 220 and 222 shut off the appliances 228 and 230, respectively, demand is detected by the meter 202 (FIG. 2). Transceiver 204 detects the new metered demand and relays the new metered demand to the CP energy management controller 302 (FIG. 3) via the transceiver station 214, the transceiver unit 106 and the site controller 110. When a large number of appliances are shut off in response to a broadcasted demand reduction control signal over the transceiver network 100 (FIG. 1), the actual demand reduction occurring at each customer premises is metered and the metered demand is relayed back to the CP energy management controller 302 such that the total demand reduction is aggregated into a single number and then provided to the control room operators 304 on a real-time basis. In one embodiment, the control room operators 304 review the total demand reduction realized and may then, if desired, instruct the CP energy management controller 302 to implement a second round of demand reduction by issuing a second demand reduction control signal out to a second load block (a plurality of pre-defined appliances).

In another embodiment, the CP energy management controller 302 compares the total metered demand reduction with a specified demand reduction, and if a demand reduction is less than the specified demand reduction, the CP energy management controller 302 automatically initiates a second round of demand reductions. With this alternative embodiment, if the total demand reduction exceeded the specified demand reduction, the CP energy management controller 302 issues a control signal to selected appliances allowing those appliances to re-power, thereby fine tuning the actual demand reduction to substantially equal the specified demand reduction requested by the control room operators 304 (FIG. 3).

b. Intelligent Network Command Control System Environment

FIG. 1 is a block diagram illustrating a portion of a transceiver network 100 in communication with a plurality of transceivers residing at a plurality of customer premises. For convenience of illustration, and for convenience of explaining the operation and functionality of the intelligent network demand control system, only a few customer premises are illustrated on FIG. 1. An intelligent network demand control system is configured to provide control, in a manner described below, to many hundreds of appliances, even many thousands of appliances, depending upon the particular demand reduction requirements of the electric utility or other responsible organization in which the intelligent network demand control system is implemented in. Therefore, the explanation of the operation and functionality of the intelligent network demand control system described below is for only a small segment of the transceiver network 100.

A first group of customer premises 116, 118 and 120, each having a meter (not shown) coupled to a transceiver 122, 123 and 124, respectively. The metered demand from each of the customer premises 116, 118 and 120 is relayed to the CP energy management controller 302 (FIG. 3) by the transceivers 122, 123 and 124, respectively. Each of the transceivers 122, 124 and 126 broadcasts an RF signal 128, 130 and 126, respectively, to the transceiver station 134 that resides on the tower 136. Metered demand information from the transceivers 122, 123 and 124 is relayed by the transceiver station 134 to the transceiver station 138 residing on tower 140 via the RF signal 142. The metered demand signals are then relayed from the transceiver station 138 to the transceiver unit 106 via RF signal 144.

One embodiment of the intelligent network demand control system employs transceivers that use standardized digital communication formats such that the information is communicated as packetized units of digital data. Other embodiments employ other suitable communication formats.

The transceiver unit 106 converts received signals, such as the received RF signal 144, into a suitable communication signal formatted for communication over a hardwire connection 112. In one embodiment, the transceiver unit 106 formats the received broadcasted RF signals into a standardized RF 232 signal. Another embodiment converts the received broadcasted metered demand information into a standardized RS 485 signal. One skilled in the art will appreciate that transceiver unit 106 may be configured to convert the received RF broadcast signals from the transceivers and/or transceiver stations of the transceiver network 100 into any suitable signal for transmission over a hardwire interconnection, such as, but not limited to, a metallic conductor, a coaxial cable, an optical fiber cable or the like.

Similarly, a second grouping of customer premises 146, 148 and 150 are illustrated. Meters (not shown) residing at each of the customer premises 146, 148 and 150 are coupled to the transceivers 152, 154 and 156, respectively. Transceivers 152, 154 and 156 are in communication with the transceiver station 158, located on the top of tower 160. Metered demand information from each of the customer premises is relayed by the transceivers 152, 154 and 156 via broadcasted RF signals 162, 164 and 166, respectively. The transceiver station 158 relays the metered demand information to transceiver 138 via a broadcasted RF signal 168. The metered demand signals broadcasted by the transceivers 152, 154 and 156 are relayed to the CP energy management controller 302 (FIG. 3) in a manner described above.

When many additional customer premises are added to the first grouping of customer premises 116, 118 and 120, such that when the meters of the many additional customer premises are coupled to transceivers and integrated into the transceiver network 100, one skilled in the art will appreciate that a large network of transceivers will be communicating metered demand information to the CP energy management controller 302, via transceiver stations 134 and 138. Similarly, many other customer premises may be integrated into the second grouping of customer premises 146, 148 and 150. For convenience of illustration, only two groupings of customer premises are illustrated in FIG. 1. Many other groupings of customer premises may be incorporated into the transceiver network 100 such that all of the transceivers of the customer premises are communicating to the CP energy management controller 302 via the transceiver network 100.

One skilled in the art will appreciate that the portion of the transceiver network 100 illustrated in FIG. 1 is configured according to the strength of the broadcasted signal from the plurality of transceivers, and the strength of the broadcasted signal from the plurality of transceiver stations. Thus, many more customer premises can be configured to communicate with any number of a plurality of transceiver units located out in the service territory of the electric utility or other responsible organization. For example, a transceiver unit 170 is illustrated coupled to the site controller 110 via connection 172. Transceiver unit 170 is configured to communicate with another transceiver network (not shown). Thus, transceiver unit 170 may serve one geographic region and transceiver unit 106 may service a different geographic region. Cut-away line 174 indicates separation of the geographic regions. However, the geographic regions are, in reality, artificial in that any transceiver may communicate with any other transceiver unit so long as its broadcast signal strength is sufficient to be detected by the transceiver unit. Thus, any boundary associated with a geographic reign is easily redefined or changed by simply reconfiguring the defined communication path for a transceiver, as described in greater detail below.

Site controller 110 is configured to output to and communicate with any desired number of transceiver units. Furthermore, a plurality of site controllers can be deployed within the service territory of the electric utility or other responsible organization, thereby increasing the area of coverage of the transceiver network 100. There are no known limitations that would limit the number of transceivers in communication with the energy delivery system control center 300 (FIG. 3) when a suitable number of transceiver units and site controllers are implemented with a plurality of transceivers to form a transceiver network 100.

Site controller 110, in another embodiment, is configured to include other functionalities. Such functionalities may be implemented in a site controller without departing substantially from the operation and functionality of the invention. For example, a site controller may continuously monitor or periodically monitor metered demand at each of the transceiver monitored meters. The monitored demand information may further be aggregated and stored for transmission to the CP energy management controller 302 (FIG. 3) at predefined periodic intervals. Such an embodiment is particularly advantageous in providing demand information such that load demand curves for monitored meters may be established. Thus, such a site controller would include other components, such as a memory and a processor. Such alternative embodiments of a site controller including additional functionality and additional components are intended to be included within the scope of this disclosure and to be protected by the accompanying claims.

Furthermore, for convenience of illustration, the site controller 110 and the transceiver unit 106 are illustrated as separate components coupled together via connection 112. In another embodiment, the transceiver unit 106 and the site controller 110 are incorporated into a single unit that performs substantially the same functionality of the transceiver unit 106 and the site controller 110. Alternatively, the transceiver unit 106 and site controller 110 may be conveniently included in the same housing. Such an alternative embodiment is particularly advantageous when it is desirable to centrally locate components to provide easy access and/or when it is desirable to enclose the devices in a single environmentally protective enclosure.

Each one of the transceivers, transceiver stations and transceiver units, have a unique identification code, such as a unique alpha-numeric identification code, a hexa-decimal code, or a like identification code. For example, transceiver 102 may have the unique identification code "102". When demand information from the customer premises 104 is relayed by the transceiver 102 to the CP energy management controller 302, the metered demand information is tagged or otherwise identified with the unique identity code "102". Thus, CP energy management controller 302 receives actual metered demand information from customer premises 104 whenever the transceiver 102 broadcasts the information. Furthermore, the CP energy management controller 302 may specifically poll the transceiver 102 to provide metered demand information by broadcasting a signal, using the unique identification code "102", such that the transceiver 102 recognizes that it is instructed to broadcast the metered demand information back to the CP energy management controller 302. Thus, the CP energy management controller 302 is in communication with all of the individual transceivers of FIG. 1 such that the received metered demand information is associated with specific customer premises. Furthermore, the CP energy management controller 302 may request a reading of the metered demand information from any desired customer premises integrated into the intelligent network demand control system by polling customer premises meter transceivers of interest.

FIG. 2 is a block diagram illustrating selected customer premises (CP) appliance controller units 220 and 222 residing in one of the exemplary customer premises 200. The exemplary customer premises 200 is a simplified representation of any customer premises which is integrated into the transceiver network 100 (FIG. 1). Thus, the customer premises 200 may be a residential type customer, an industrial type customer, wholesale type customer or other suitable customer.

Residing in the customer premises 200 are a plurality of appliances. Many appliances (not shown) residing in the customer premises 200 are not suitable for integrating into the intelligent network demand control system. For example, if the customer premises 200 is a residential type customer, appliances such as televisions, light fixtures or hair dryers are not suitable for integrating into an intelligent network demand control system. Appliances such as a television or the like are not suitable because the customer will not tolerate demand reductions at unpredictable times since the customer does not desire to be interrupted in the middle of a TV program or at times when the appliance is being operated. Electric light fixtures may not be suitable for integrating into the intelligent network demand control system because the demand reduction actually realized when the lights are shut off would typically not be significant enough to justify the expense of installing a CP appliance controller unit. Furthermore, if a demand reduction is required during a time when the customer is not home, or during the day time, the lights would most probably be shut off such that a demand reduction control signal would have no meaningful impact in reducing metered demand at the customer premises. Also, shutting off lights during the nighttime when the customer is home may present a safety hazard. Small appliances such as the portable, hand-held hair dryer are not particularly suitable for implementing into an intelligent network demand control system because such appliances would not provide any significant demand reduction that would justify the expenditure of a CP appliance controller unit, and the probability that the hair dryer would actually be operating at the time a demand reduction is needed would be very low. Furthermore, a customer using the hair dryer would not tolerate the shutting off of the hair dryer when a demand reduction control signal is issued by the CP energy management controller 302 (FIG. 3). Thus, one skilled in the art will appreciate that many of the appliances (not shown) residing in a customer premises are not suitable for integration into an intelligent network demand control system.

However, many appliances are suitable for integration into an intelligent network demand control system. For example, but not limited to, an air conditioning unit may be particularly well suited for implementing into an intelligent network demand control system. An air conditioning unit may likely be operating at times when the control room operators 304 (FIG. 3) instruct the CP energy management controller 302 to implement a demand reduction. If the air conditioning unit is shut off by the CP energy management controller 302 for a reasonably limited period of time, the temperature within the customer premises is not likely to increase to an unacceptable temperature. Thus, the customer would not be unduly inconvenienced by the shutting off of the air conditioning unit.

Other appliances may be similarly suitable for integration into an intelligent network demand control system. For example, if the customer premises is an industrial manufacturing facility, the manufacturing machines at the customer premises may be integrated into the intelligent demand control system. When the control room operators 304 instruct the CP energy management controller 302 to reduce demand, the manufacturing production line would be shut down, thereby resulting in a considerable reduction in system demand. Here, shutting down an entire production line may greatly inconvenience the customer. However, the electric utility or the other responsible organization may have provided special pricing incentives to induce the customer to participate in an energy control plan such that the customer voluntarily agrees to integrate the appliances into the intelligent network demand control system. One embodiment provides a pre-notification signal to the customer such that the customer has time to prepare for an impending demand reduction.

Appliance 228 includes a power switch 224 that is coupled to a power outlet 236. Power outlet 236 includes a plurality of receptacles 238 such that the appliance power cord 240 is coupled to a receptacle 238 via the plug 242. The receptacles 238 of the power outlet 236 are coupled to the customer premises electrical system network 246 via connection 248. The customer premises electrical system network 246 is coupled to the meter 202 via connection 250. The meter 202 is coupled to the electric utility or the other responsible organization electric distribution system (not shown) via a connection known as a distribution service drop (not shown).

The CP appliance controller unit 220 is coupled to the power switch 224 of the appliance 228 via connection 252. When the CP energy management controller 302 (FIG. 3) issues a demand reduction control signal specifically to the transceiver 220, a broadcasted RF signal 232 is received from the transceiver network 100 (FIG. 1) such that the CP appliance controller unit 220 recognizes that the CP energy management controller 302 has instructed it to shut off the appliance 228. CP transceiver controller unit 220 then actuates the power switch 224 such that the appliance is shut off.

When the control room operators 304 (FIG. 3) determine that the reduction in system demand is no longer required, the control room operators 304 instruct the CP energy management controller 302 to terminate the demand reduction. An end of the demand reduction control signal is then broadcasted out to the CP transceiver controller unit 220 such that the power switch 224 is enabled. Depending on the nature of the appliance 228, the appliance may then automatically turn itself on. For example, if appliance 228 is an air conditioning unit, the house temperature may have increased to a point such that the thermostat (not shown) may be instructing the appliance 228 to turn on. However, the temperature in the customer premises may be such that the thermostat may not be instructing the air conditioning appliance 228 to turn on to provide cooling to the customer premises 200. Thus, when the CP appliance controller unit 220 enables the power switch 224, the air conditioning appliance 228 would not turn on because the controlling thermostat would not be instructing the air conditioning appliance 228 to be on.

Another appliance 230 residing in the customer premises 200 is illustrated as being integrated into the intelligent network demand control system. Here, a CP appliance controller unit 222 is coupled to the power switch 226 of the appliance 230 via connection 254. The appliance 230 is coupled directly to the electrical system network 246 via a connection 256.

Summarizing, the control room operators 304 (FIG. 3) determine that a reduction in system demand is desirable. The control room operators 304 instruct the CP energy management controller 302 (FIG. 3) to issue a demand reduction control signal to the CP appliance controller unit 220 and/or the CP appliance controller unit 222. Upon receiving the demand reduction control signal over the transceiver network 100 (FIG. 1), the CP appliance controller unit 220 and/or the CP appliance controller unit 222 disable the power switch 224 and/or the power switch 226 of the appliances 228 and 230, respectively. The transceiver 204 coupled to meter 202 detects the new metered demand at the meter 202, and then transmits the metered demand information through the transceiver network 100 to the CP energy management controller 302.

The CP energy management controller 302 aggregates the metered demand information received from all of the appliances, including the appliance 228 and/or appliance 230, that were instructed to be shut off in accordance with the demand reduction control signal. By comparing the metered demand information before the demand reduction with metered information after the demand reduction, an aggregate change in metered demand may be determined. The aggregated metered demand information is then provided to the control room operators 304 so that the control room operators 304 can determine the effectiveness of the requested reduction in system demand.

In an alternative embodiment, the transceiver 204 monitoring metered demand compares the metered demand information before the demand reduction control signal is received by transceivers 228 and/or 230 with the metered demand after the transceivers 228 and/or 230 have shut off their respectively controlled appliances. Transceiver 204 then transmits the change in metered demand back to the CP energy management controller 302 (FIG. 3). Such an alternative embodiment is desirable when transceivers monitoring the meters include processing capabilities that are readily adaptable to computing a change in metered demand and when it is desirable to transmit the change in metered demand, thereby reducing the computational requirements at the CP energy management controller 302.

c. Integrating the Intelligent Network Demand Control System Into An Energy Delivery System Control Center FIG. 3 is a block diagram illustrating selective components of an energy delivery system control center 300 in communication with the transceiver network 100. Included as an integral component of the intelligent network demand control system is the customer premises (CP) energy management controller 302. The CP energy management controller 302 is coupled to at least one of the previously described site controllers 110 via connection 306. Connection 306 is coupled to connection 114 (FIGS. 1 and 2) through an intermediary communication system, described in detail below.

CP energy management controller 302 includes at least a processor 308, a memory 310 and an interface 312. Memory 310 includes at least a database 314 and the energy management controller logic 316. Processor 308 is coupled to the memory 310 via connection 318 and is coupled to the interface 312 via connection 320.

When the plurality of transceivers coupled to the customer premises meters relay metered demand information through the intelligent network demand control system, the CP energy management controller 302 receives the metered demand information and stores the received demand information into database 314. Processor 308 executes the energy management controller logic 316 to appropriately store the received metered demand information into the database 314. In one embodiment, database 314 employs a look up table.

The database 314 includes information of interest such as the identification code of each the transceivers coupled to the meters, the time that the metered demand was received from the meter, the location of the transceiver, and the magnitude of the metered demand. Other information of interest may also be included in the database 314. For example, information identifying the specific customer, customers address and/or attributes of the customer's load may be included within database 314. The nature of the appliance that is controlled by the controlling transceiver may also be included within the database 314. One skilled in the art will appreciate that any type of information of interest may be included within the database 314. Furthermore, information regarding attributes of transceiver stations, transceiver units and site controllers, such as identification codes and locations, may be included in database 314.

In one embodiment, the database 314 is configured to store metered demand information over predefined periods of time. The energy management controller logic 316 is configured to analyze the meter demand information such that customer load profiles may be determined for various periods of time and/or for various operating conditions. Such an embodiment is desirable when the CP energy management controller 302 is used as a predictive tool by the control room operators 304 when ascertaining reductions in demand that may be realized when the CP energy management controller 302 is requested to initiate a reduction in demand. Furthermore, such an embodiment may be employed to more accurately define a second plurality of CP appliance controller units that will be instructed to shut off their controlled appliances when the CP energy management controller 302 initiates a second round of demand reduction, described in greater detail below.

The CP energy management controller 302 is illustrated as being coupled to the control console 322, via connection 324. Typically, the control room operators 304 interface with the various components residing in the energy delivery system control center 300 via one or more control consoles 322. Thus, a control room operator 304, after determining that a reduction in system demand is desirable, instructs the CP energy management controller 302 to issue a demand reduction control system out to a predefined group of transceivers via the control console 322.

Once the demand reduction control signal has been transmitted through the transceiver network 100 out to the plurality of transceivers controlling appliances such that the appliances are shut off, transceivers coupled to the customer premises meters relay the new metered demand information and/or the change in demand information back to the CP energy management controller 302. The metered demand information received from the plurality of transceivers coupled to the customer premises meters are stored into the database 314. Processor 306 then continues execution of the energy management controller logic 316 such that the aggregate metered demand change is determined. The aggregate metered demand change is then indicated to the control room operators 304 by providing the information to the control console 322. A processing unit (not shown) residing in the control console 322 would format and display the aggregate metered demand change and/or a change in system demand to the control room operators 304 on the display screen 326.

The energy delivery system control center 300 (FIG. 3) illustrates two additional components of interest typically residing in a conventional energy delivery system control center 300. An electric system grid controller 328 is coupled to the control console 322 via connection 330. Such electric system grid controllers 328 are often referred to as a system control and data acquisition (SCADA) system 328. The SCADA system 328 is configured to enable the control room operators 304 to determine and control the status of the various electrical system transmission components (not shown) that reside in the electrical distribution system. For example, the control room operators 304 may determine whether or not a transmission line segment is energized and operating properly by reviewing information provided by the SCADA system 328 on the display screen 326. Furthermore, the control room operators 304 typically have direct control over the status of many of the components of the electric transmission system. For example, the control room operators 304 may determine that the above-described transmission line segment is not operating properly, and may instruct control devices (not shown) to electrically decouple the transmission line segment from the electric transmission system by entering the appropriate control commands through the control console 322.

Another component typically residing in an energy delivery system control center 300 is the energy management system 332. The energy management system 332 typically provides information to the control console 322, via connection 334, relating to the energy supply and energy demand aspects of the system. For example, the energy management system 332 may provide information regarding the output of each of the generators under the control of the electric utility or the other responsible organization. The energy management system 332 may also provide information regarding the system purchases. Such information from the energy management system 332 includes amounts of available unused generation resources or possible amounts of energy and/or demand that may be purchased. Furthermore, the cost of obtaining the available generation and/or purchases will be provided to the control room operators 304. Thus, the control room operators 304 may make decisions effecting the control of the electric system, and the mix of generation resources, based upon economic factors and other considerations. At certain times, the control room operators 304 may determine, based upon information provided by the SCADA system 328 and/or the energy management system 332, that an anticipated increase in system demand cannot be met either because generation resources and/or purchased resources are not available, or because any available generation resources and/or purchased resources are too expensive to obtain. If so, the control room operators 304 may determine that it is desirable to instruct the CP management controller 302 to issue a demand reduction control signal to offset the anticipated increase in system demand. Thus, the anticipated increase in system demand may be substantially offset by the requested decrease in metered demand under the control of the intelligent network demand control system, thereby minimizing the potential and undesirable mismatch between energy demand and energy supply.

Figure 4:
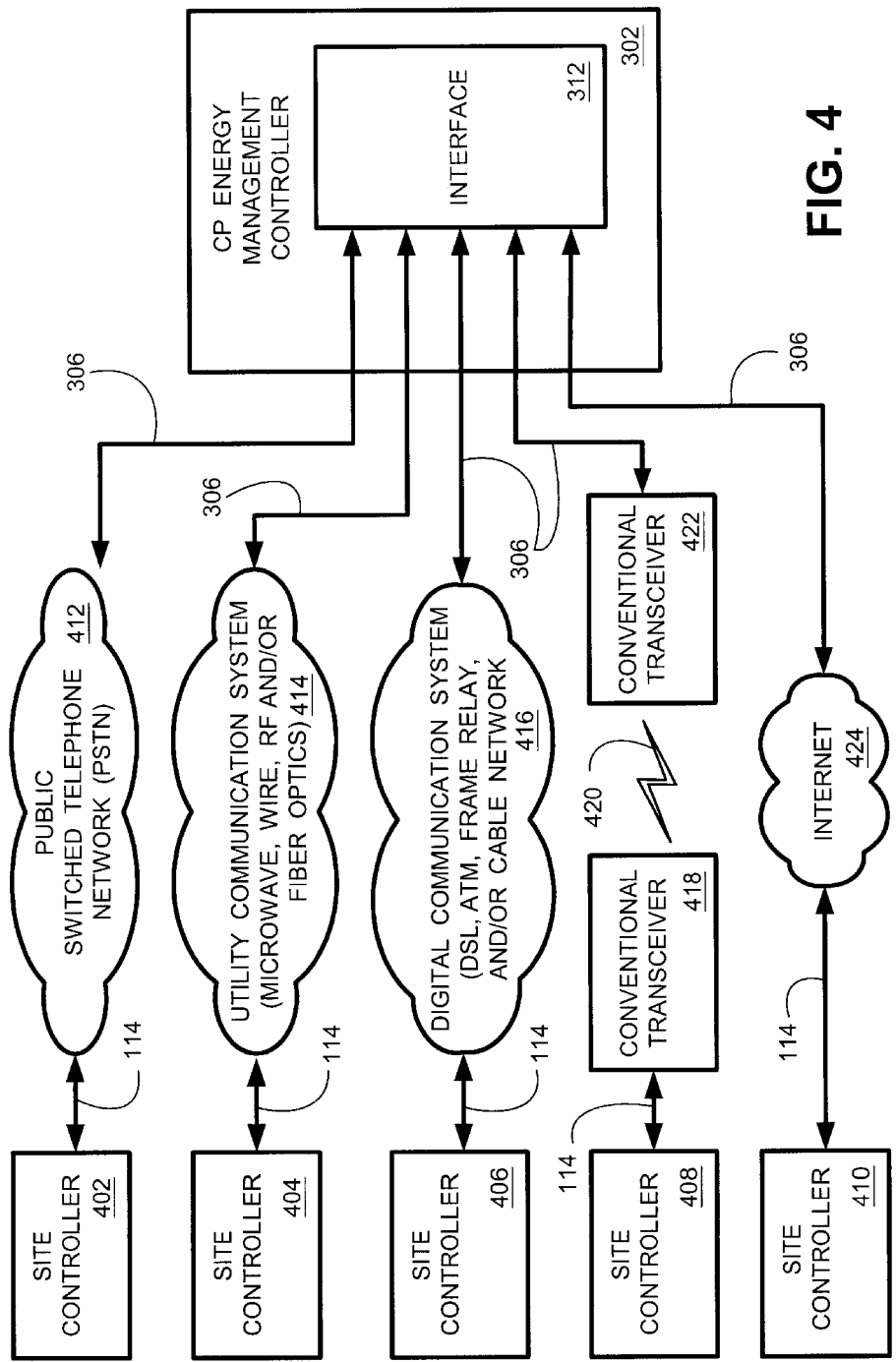
FIG. 4 is a block diagram illustrating alternative communication systems employed by the intelligent network demand control system of FIGS. 1–3.

Another scenario in which it may be desirable to instruct the CP energy management controller 302 to issue a demand reduction control signal to reduce metered demand is the situation where an amount of generation capacity and/or purchase capacity is suddenly and unexpectedly lost. For example, a generating unit may suddenly and unexpectedly shut down. Or, a purchase may suddenly and unexpectedly be terminated. Or, a portion of the electric transmission system, such as a transmission line or a transformer, may fail such that energy available from the generation resources and/or the purchased resources cannot be delivered to the customer premises. In these situations, the control room operators 304 may determine that a demand reduction control signal should be issued by the CP energy management controller 302 such that metered demand is reduced out on the electrical system.

d. Communication Between Site Controllers and the CP Energy Management Controller As described above with reference to FIGS. 1–3, a site controller 110 (FIGS. 1 and 2) is in communication with the interface 312 residing in the CP energy management controller 302 (FIGS. 3 and 4). FIG. 4 is a block diagram illustrating alternative communication systems employed by the intelligent network demand control system. Five exemplary site controllers 402, 404, 406, 408 and 410 are illustrated as being coupled to the interface 312 residing the CP energy management controller 302 via five conventional communication systems. These exemplary communication systems are intended to illustrate some possible communication systems through which the connections 114 (FIGS. 1–2) and 306 (FIG. 3) may be coupled to such that the intelligent network demand control system enables communication between the site controllers and the CP energy management controller 302.

Site controller 402 is communicating to interface 312 via a conventional public switched telephone network (PSTN) 412, via connections 114 and 306. Thus, site controller 402 is configured to provide a suitable signal having metered demand information that is provided to the PSTN 412. PSTN 412 receives the suitably configured metered demand information from the site controller 402 and relays the information to the interface 312. Interface 312 converts the received metered demand information from the PSTN 412 and reformats the metered demand information into a suitable communication signal that is provided to processor 308 (FIG. 3) such that the metered demand information is stored in the database 314 (FIG. 3) in a manner described above.

When the CP energy management controller 302 issues a demand reduction control signal instructing preselected transceivers to shut off selected appliances, the interface 312 converts the demand reduction control signal into a suitable signal formatted for communication over the PSTN 412. The suitably formatted demand reduction control signal is then communicated through the PSTN 412 and is transmitted to the site controller 402. The site controller 402 then converts the received demand reduction control signal from the PSTN 412 into a suitably formatted signal for transmission out to the appliance controlling transceivers as described above.

The components (not shown) residing in the interface 312 and the site controller 402 that are configured to transmit, receive and convert signals from the PSTN 412 are well known in the art and, therefore, are not described in detail herein other than to the extent necessary to understand the operation and functioning of these components when employed as part of the interface 312 and the site controller 402. One skilled in the art will realize that such well known components are too numerous to describe in detail herein, and that any configuration of such well known components having the above-described functionality may be implemented in the interface 312 and the site controller 402 without departing substantially from the intelligent network demand control system. Any such implementation of components configured to receive and convert communication signals from PSTN 412 are intended to be within the scope of this disclosure and to be protected by the accompanying claims.

Site controller 404 is communicating to interface 312 via the legacy utility communication system 414, via connections 114 and 306. Thus, site controller 404 is configured to provide a suitable signal having metered demand information that is provided to the legacy utility communication system 414. The legacy utility communication system 414 is a well known communication system employed by the electric utility or other responsible organization for the monitoring and/or control of the electric energy distribution system.

The legacy utility communication system 414 is a conventional integrated network of communication technologies that may include microwave communication systems, conventional wire based communication systems, RF communications or fiber optics networks. Furthermore, these various communication systems are integrated into a composite communication system. Thus site controller 404 is configured to interface at convenient locations on the legacy utility communication system 414 such that the site controller 404 provides the appropriately formatted information to the legacy utility communication system.

For example, site controller 404 may integrate into an existing fiber optics portion of the legacy utility communication system 414. In one embodiment, site controller 404 would be configured to interface with a suitably configured fiber optics connector to provide interconnectivity directly to the fiber optics networks, or alternatively, is configured to communicate with various communication components that are associated with the communication of optical signals over the fiber optics network. Another embodiment of site controller 404 is configured to communicate with the microwave portions, the conventional wire portions, or the RF portions of the legacy utility communication system 414.

The legacy utility communication system 414 receives the suitably configured metered demand information from the site controller 410 and relays the information to the interface 312. Interface 312 converts the received metered demand information from the legacy utility communication system 414 and reformats the metered demand information into a suitable communication signal that is provided to processor 308 (FIG. 3) such that the metered demand information is stored in the database 314 (FIG. 3) in a manner described above.

When the CP energy management controller 302 issues a demand reduction control signal instructing preselected transceiver to shut off selected appliances, the interface 312 converts the demand reduction control signal into a suitable signal formatted for communication over the legacy utility communication system 414. The suitable formatted demand reduction control signal is then communicated through the legacy utility communication system 414 and is transmitted to the site controller 404, via connections 306 and 114. The site controller 404 then converts the received demand reduction control signal from the legacy utility communication system into a suitably formatted signal for transmission out to the appliance-controlling transceivers as described above.

The components (not shown) residing in the interface 312 and the site controller 404 that are configured to transmit, receive and convert signals from the legacy utility communication system are well known in the art and, therefore, are not described in detail herein other than to the extent necessary to understand the operation and functioning of these components when employed as part of the interface 312 and the site controller 404. One skilled in the art will realize that such well known components are too numerous to describe in detail herein and that any configuration of such well known components having the above-described functionality may be implemented in the interface 312 and the site controller 404 without departing substantially from the intelligent network demand control system. Any such implementation of the components configured to receive and convert communication signals from the legacy utility communication system 414 are intended to be within the scope of this disclosure and to be protected by the accompanying claims.

Site controller 406 is communicating to interface 312 via a conventional digital communication system 416, via connections 114 and 306. Thus, site controller 406 is configured to provide a suitable signal having metered demand information that is provided to the digital communication system 416. The digital communication system 416 is a conventional based communication system configured to communicate information in a digital format. Non-limiting examples of such digitally based communications systems include digital subscriber loops (DSL), X.25, Internet protocol, (IP), Ethernet, Integrated services digital network (ISDN) and asynchronous transfer mode (ATM). Such digital communication systems may employ a PSTN, a frame relay based network and/or cable network. Furthermore, such digital communication systems may employ combinations of the above-described systems having a plurality of segments employing different technologies on each segment.

The digital communication system 416 receives the suitably configured demand information from the site controller 406 and relays the information to the interface 312. Interface 312 converts the received metered demand information from the digital communication system 416 and reformats the metered demand information into a suitable communication signal that is provided to processor 308 (FIG. 3) such that the metered demand information is stored in the database 314 (FIG. 3) in a manner described above.

When the CP energy management controller 302 issues a demand reduction control signal instructing preselected transceivers to shut off selected appliances, the interface 312 converts the demand reduction control signal into a suitable signal formatted for communication over the digital communication system 416. The suitably formatted demand reduction control signal is then communicated to the digital communication system 416 and is transmitted to site controller 406, via connections 306 and 114. The site controller 406 then converts the received demand reduction control signal from the digital communication system 416 into a suitably formatted signal for transmission out to the appliance controlling transceivers as described above.

The components (not shown) residing in the interface 312 and site controller 406 that are configured to receive and convert signals from the digital communication system 416 are well known in the art and, therefore, are not described in detail herein other than to the extent necessary to understand the operation and functioning of these components when employed as part of the interface 312 and the site controller 406. One skilled in the art will realize that such well known components are too numerous to describe in detail herein, and that any configuration of such well known components having the above-described functionality may be implemented in the interface 312 and the site controller 406 without departing substantially from the intelligent network demand control system. Any such implementation of the components configured to receive and convert communication signals from the digital communication system are intended to be within the scope of this disclosure and to be protected by the accompanying claims.

Site controller 408 is communicating to interface 312 via a conventional radio frequency (RF) communication system having at least a first conventional transceiver 418 configured to broadcast RF signals 420 to conventional transceiver 422. An alternative embodiment employs other mediums of broadcast signals, such as, but not limited to, microwave. Thus, site controller 408 is configured to provide a suitable signal having metered demand information that is provided to the conventional transceiver 418. The conventional transceiver 418 receives the suitably configured metered demand information from the site controller 408 and relays the information to conventional transceiver 422. The conventional transceiver 422 relays the information to the interface 312. Interface 312 converts the received metered demand information from the conventional transceiver 422 and reformats the metered demand information into a suitable communication signal that is provided to processor 308 (FIG. 3) such that the metered demand information is stored in the database 314 in a manner described above.

When the CP energy management controller 302 issues a demand reduction control signal instructing the preselected transceivers to shut off selected appliances, the interface 312 converts the demand reduction control signal into a suitable signal formatted for communication by the conventional transceivers 418 and 422. The suitably formatted demand reduction control signal is then communicated through the conventional transceiver 422 to the conventional transceiver 418, and then to the site controller 408. The site controller 408 then converts the received demand reduction control from conventional transceiver 416 into a suitably formatted signal for transmission out to the appliance controlling transceivers as described above.

The components (not shown) residing in the interface 312 and the site controller 408 that are configured to transmit, receive and convert signals from the conventional transceivers 418 and 422 are well known in the art and, therefore, are not described in detail herein other than to the extent necessary to understand the operation and functioning of these components when employed as part of the interface 312 and the site controller 408. One skilled in the art will realize that such well known components are too numerous to describe in detail herein, and that any configuration of such well known components having the above-described functionality may be implemented in the interface 312 and the site controller 408 without departing substantially from the intelligent network demand control system. Any such implementation of the components configured to receive and convert communication signals from the conventional transceivers 418 and 422 are intended to be within the scope of this disclosure and to be protected by the accompanying claims.

Site controller 410 is communicating to interface 312 via a conventional Internet system 424, via connections 114 and 306. Thus, site controller 410 is configured to provide a suitable signal having meter demand information that is provided to the Internet system 424. Internet system 424 receives the suitably configured meter demand information from the site controller 410 and relays the information to the interface 312. Interface 312 converts the received meter demand information from the Internet system 424 and reformats the meter demand information into a suitable communication signal that is provided to processor 308 (FIG. 3) such that the meter demand information is stored in the database 314 (FIG. 3) in a manner described above.

When the CP energy management controller 302 issues a demand reduction control signal instructing preselected transceivers to shut off selected appliances, the interface 312 converts the demand reduction control signal into a suitable signal formatted for communication over the Internet system 424. The suitably formatted demand reduction control signal is then communicated through the Internet system 424 and is transmitted to the site controller 410. The site controller 410 then converts the received demand reduction control signal from the Internet system 424 into a suitably formatted signal for transmission out to the appliance controlling transceivers as described above.

The components (not shown) residing in the interface 312 and the site controller 410 that are configured to transmit, receive and convert signals from the Internet system 424 are well known in the art and, therefore, are not described in detail herein other than to the extent necessary to understand the operation and functioning of those components when employed as part of the interface 312 and the site controller 410. One skilled in the art will realize that such well known components are too numerous to describe in detail herein, and that any configuration of such well known components having the above-described functionality may be implemented in the interface 312 and the site controller 410 without departing substantially from the intelligent network demand control system. Any such implementation of components configured to receive and convert communication signals from the Internet system 424 are intended to be within the scope of this disclosure and to be protected by the accompanying claims.

Other embodiments of the site controllers and the interface 312 are configured to communicate with other conventional communication networks or combination networks having a plurality of segments employing different communication technologies on each segment. For example, a site controller and an interface could be configured to communicate over satellite-based communication systems. Another example includes a combination system that employs the utility communication system 414 and the Internet system 424. Such a combination system would include an interface device to interface the utility communication system 414 with the Internet system 424. One skilled in the art will appreciate that there are no intended limitations with respect to the interfacing communication technology through which a site controller and an interface 312 (FIG. 3) communicate. Any such implementation of a site controller and an interface 312 configured to communicate through a conventional communication technology in accordance with the operation and functionality of the intelligent network demand control system described herein is intended to be within the scope of this disclosure and to be protected by the accompanying claims.

One embodiment of the site controller employs a plurality of standardized components, and is configured to receive an interface card. The interface card is configured to provide connectivity to the communication system that is used by the intelligent network demand control system to communicate over. Such an embodiment is particularly suited to implementing a mass produced intelligent network demand control system.

e. Embodiment of a Customer Premises Appliance Controller Unit

Figure 5:
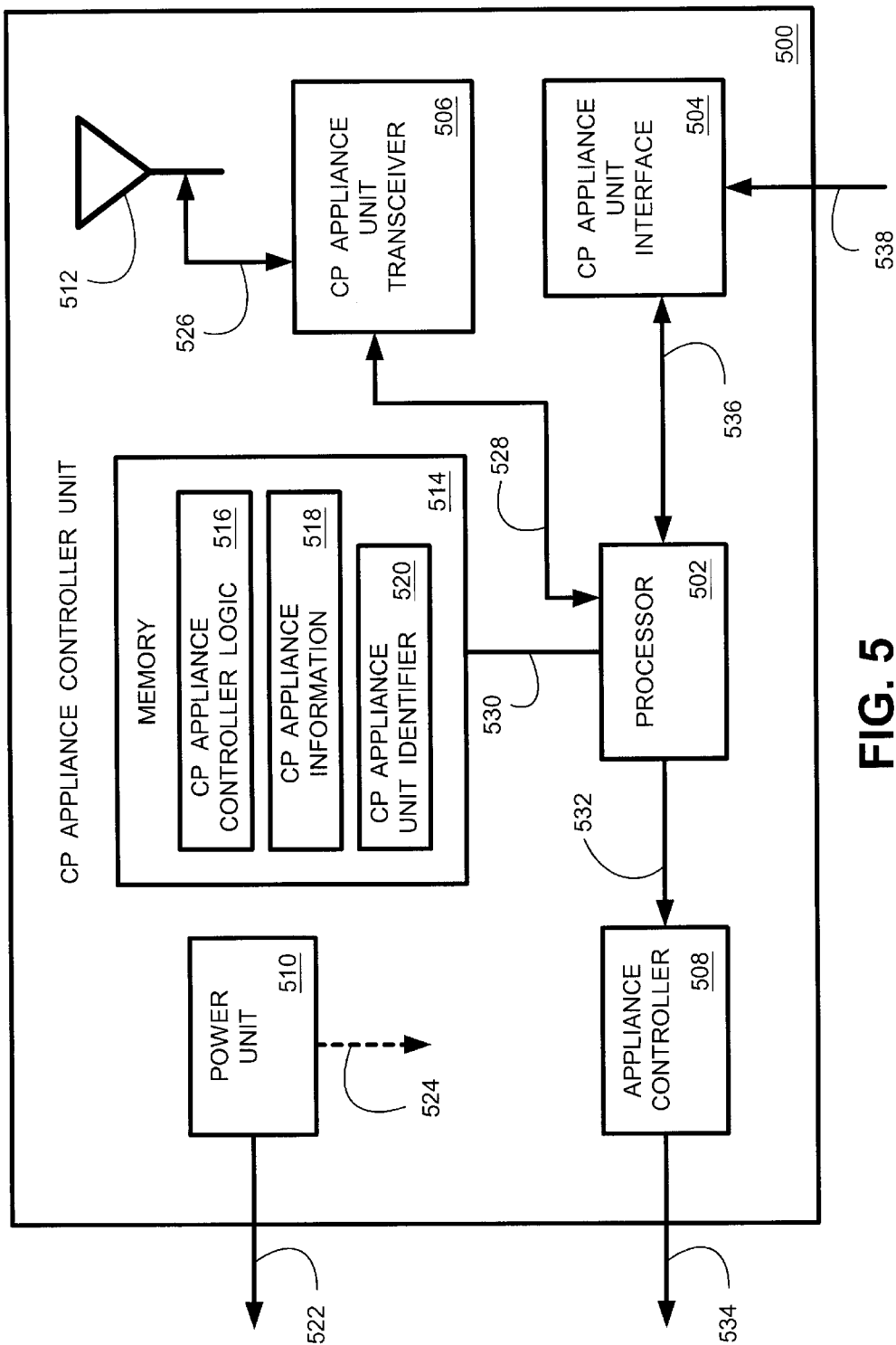
FIG. 5 is a block diagram illustrating an embodiment of a customer premises (CP) appliance controller unit residing in the customer premises appliance controller unit of FIG. 2

FIG. 5 is a block diagram illustrating selected components residing in the customer premises (CP) appliance controller units 220 and 222 (FIG. 2). The CP appliance controller unit 500 includes at least a processor 502, a CP appliance unit interface 504, a CP appliance unit transceiver 506, an appliance controller 508, a power unit 510, an antenna 512 and a memory 514. Memory 514 includes at least the CP appliance controller logic 516, the CP appliance information 518 and the CP appliance unit identifier 520.

Power requirements of the CP appliance controller unit 500 are provided by the power unit 510. The power unit 510 is coupled to a convenient power source, such as the CP electrical system network (not shown) 246 (FIG. 2) or a receptacle of a power outlet (not shown), via connection 522. Power unit 510, if necessary, converts the voltage received over connection 522 to a suitable voltage for the components residing in the CP appliance controller unit 500. Connection 524, illustrated as a dashed line, is coupled as necessary (not shown) to the various components residing in the CP appliance controller unit 500. This embodiment of the CP appliance controller unit 500 is particularly suited for application wherein the person installing the CP appliance controller unit has easy access to the customer premises electric system network 246 (FIG. 2).

The components (not shown) residing in the power unit 510 that are configured to convert and transmit power to the components of the CP appliance controller unit 500 are well known in the art and, therefore, are not described in detail herein other than to the extent necessary to understand the operation and functioning of these components when employed as part of the CP appliance controller unit 500. One skilled in the art will realize that such well known components are too numerous to describe in detail herein, and that any configuration of such well known power supply components may be implemented in the CP appliance controller unit 500 without departing substantially from the operation and functionality of the CP appliance controller unit 500 as described below. Any such implementation of the components configured to provide power to the components of the CP appliance controller unit 500 are intended to be within the scope of this disclosure and to be protected by the accompanying claims.

When the CP energy management controller 302 (FIG. 3) issues a demand reduction control signal, the demand reduction control signal is broadcasted out into the transceiver network 100 (FIG. 1) via a plurality of transceiver units. The demand reduction control signal, which includes identification numbers for preselected CP appliance controller units, is detected by the antenna 512. Antenna 512 transmits the received demand reduction control signal to the CP appliance unit transceiver 506, via connection 526. The CP appliance unit transceiver 506 is configured to receive RF signals from antenna 512 and is further configured to transmit a suitably formatted demand reduction signal to processor 502, via connection 528.

When processor 502 senses an incoming demand reduction control signal, processor 502 retrieves and executes the CP appliance controller logic 516 residing in memory 514, via connection 530. The processor 502 also retrieves an identification number residing in the CP appliance unit identifier 520 portion of the memory 514. Processor 502, executes the CP appliance controller logic 516 to compare the CP appliance controller unit 500 identification number with the received demand reduction control signal. If the CP appliance controller unit 500 identification number corresponds to an identification number associated with the demand reduction control signal, processor 502 provides a shut-off control signal, via connection 532, to the appliance controller 508. Appliance controller 508 is configured to provide an appliance shut-off control signal, via connection 534, to the appliance coupled to the CP appliance controller unit 500 such that the appliance is shut off.

However, if the CP appliance controller unit 500 identification number does not correspond to the identification number associated with the demand reduction control signal, processor 502 does not send a shut-off control signal to the appliance controller 508. That is, if the identification number of the CP appliance controller unit 500 does not correspond to information associated with the demand reduction control signal, processor 502 understands that its appliance is not to be shut off.

An alternative embodiment of the CP appliance controller unit 500 employs a load block identification number that is associated with the CP appliance controller unit 500. The load block identification number resides in the CP appliance unit identifier 520. The load block identification number is used to associate a predefined number of CP appliance controller units into a single load block. Thus, a plurality of different CP appliance controller units can be aggregated into a plurality of different load blocks such that the demand reduction control signal may be simplified to include only the load block identification number. Thus, the CP appliance controller units shut off their respective controlled appliances when a received load block identification number (residing in a detected demand reduction control signal) matches with the load block identification number of the CP appliance controller units. Such an embodiment is particularly suitable in providing control over an electric distribution system having many customer premises. Furthermore, the amount of demand reduction associated with each load block identification number can be statistically estimated. A statistically estimated demand reduction associated with each load block identification number is used in one embodiment, described in greater detail below, to select a plurality of CP appliance controller units such that the reduction in demand substantially equals a specified demand reduction from the control operators 304 (FIG. 3).

For operating convenience, one embodiment of the CP appliance controller unit 500 includes an optional CP appliance unit interface 504. The CP appliance unit interface 504 is coupled to processor 502 via connection 536. CP appliance interface 504 provides an interface, via connection 538, such that a person installing and/or maintaining the CP appliance controller unit 500 may input desired information into the memory 514 of the CP appliance controller unit 500. For example, the person may specify an identification number for the CP appliance controller unit 500. Or, the person may specify information regarding the nature of the appliance that is controlled by the CP appliance controller unit 500. For example, the appliance may be an air conditioning unit (not shown). This information, and other associated information, may be input into the CP appliance controller unit 500 and stored in the CP appliance information 518 portion of memory 514. Additionally, the CP appliance unit interface 504 allows for the updating of the CP appliance controller logic 516.

In one embodiment, the CP appliance unit transceiver 506 is configured to broadcast information out into the transceiver network 100 (FIG. 1) by generating a suitable RF communication signal for broadcast over the antenna 512. For example, when the CP appliance controller unit 500 shuts off the appliance to which it is coupled to, the CP appliance controller unit 500 may be configured to transmit an acknowledgment signal such that the acknowledgment signal is relayed back to the CP energy management controller 302 (FIG. 3), thereby indicating to the CP energy management controller 302 that the CP appliance controller unit 500 has successfully shut off the appliance.

The CP appliance controller unit 500, in another embodiment, is configured to include with the broadcasted RF acknowledgment signal additional information residing in the CP appliance information 518 portion of memory 514, and/or the identification number of the CP appliance controller unit 500 residing in the CP appliance unit identifier 520 portion of memory 514. Also, information may be broadcasted in response to an information request from the CP energy management controller 302, may be included with a confirmation broadcast from the CP appliance controller unit 500 and/or may be transmitted on a periodic basis to the CP energy management controller 302 for maintenance purposes described below.

Appliance controller 508, as described above, is configured to generate and transmit a control signal to the appliance that the CP appliance controller unit 500 is coupled to. Appliance controller 508 is configured to generate an appropriate control signal that is based upon the particular appliance to which the CP appliance controller unit 500 is coupled to. For example, if the CP appliance controller unit 500 is coupled to an air conditioning unit, the appliance controller 508 is configured to generate a suitable command into the air conditioner appliance control unit such that the air conditioner will shut off upon receiving appliance shut-off control signal from the appliance controller 508. The components (not shown) residing in the appliance controller 508 that are configured to transmit an appliance shut-off control signal to the appliance are well known in the art and, therefore, are not described in detail herein other than to the extent necessary to understand the operation and functioning of the appliance controller 508 when employed as part of the CP appliance controller unit 500. One skilled in the art will realize that such well known components are too numerous to describe in detail herein, and that any configuration of such well known components having the above-described functionality may be implemented in the appliance controller 508 without departing substantially from the operation and functionality of the CP appliance controller unit 500 as described above. Any such implementation of the components of an appliance controller 508 are intended to be within the scope of this disclosure and to be protected by the accompanying claims.

Figure 6:
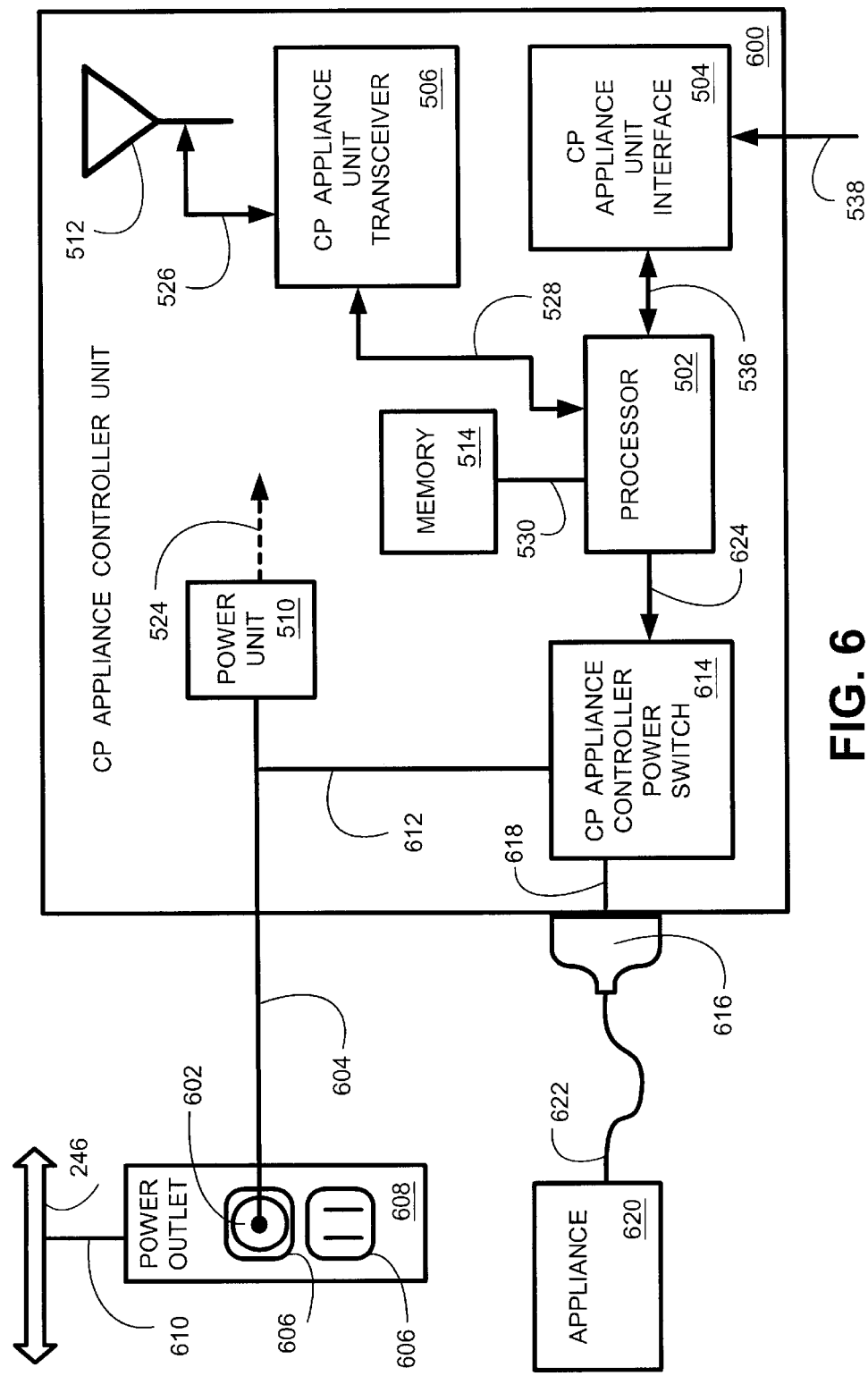
FIG. 6 is a block diagram illustrating an alternative embodiment of CP appliance controller unit of FIG. 2.

FIG. 6 is a block diagram illustrating an alternative embodiment of a CP appliance controller unit 600. Components residing in the CP appliance controller unit 600 that are similar to, or identical to, the components residing in the CP appliance controller unit 500 (FIG. 5) employ the same reference number and are not described again in detail herein. That is, the CP appliance controller unit 600 is configured substantially similar to the CP appliance controller unit 500 and has substantially similar operational and functionality characteristics as the CP appliance controller unit 500. However, the CP appliance controller unit 600 is configured for conveniently controlling types of appliances that employ conventional plug-in connections for coupling to a conventional power outlet.

The CP appliance controller unit 600 includes a conventional plug 602 coupled to a connection 604 such that the plug 602 may be conveniently coupled to the receptacles 606 of the conventional power outlet 608. The receptacles 606 are coupled to the CP electrical system network 246 (see also FIG. 2), via connection 610. Connection 604 is coupled to the power unit 510 such that power is provided to the components residing within the CP appliance controller unit 600. Connection 604 is further coupled to connection 612. Connection 612 is coupled to the CP appliance controller power switch 614.

The CP appliance controller unit 600 is simply installed by coupling the plug 602 into the power outlet, and then coupling the appliance plug 616 to connection 618. Thus the appliance 620 receives power from the receptacle 606 via the connection 604, the connection 612, the CP appliance controller power switch 614, the connection 618 and the connection 622.

When the CP appliance controller unit 600 receives a demand reduction control signal instructing the CP appliance controller unit 600 to shut off the appliance 620, the processor 502, via connection 624, provides a shut-off control signal to CP appliance controller switch 614 such that electrical connectivity between connection 612 and 618 is broken. That is, when processor 502 determines that it is to shut off the appliance 620, the processor 502 actuates a switch residing in the CP appliance controller power switch 614 such that power is disconnected from appliance 620. The CP appliance controller unit 600 is particularly suited for controlling appliances such as refrigerators, freezers and other types of appliances that are configured to receive power from conventional power outlets.

The components (not shown) residing in the CP appliance controller power switch 614 that are configured to provide electrical connectivity between connections 612 and 618 are well known in the art and, therefore, are not described in detail herein other than to the extent necessary to understand the operation and functioning of these components when employed as part of the CP appliance controller unit 600.

One skilled in the art will realize that such well known components are too numerous to describe in detail herein, and that any configuration of such well known components having the above-described functionality may be implemented in the CP appliance controller power switch 614 without departing substantially from the operation and functionality of the CP appliance controller unit 600. Any such implementation of the components configured to control electrical power between connection 612 and 618 are intended to be within the scope of this disclosure and to be protected by the accompanying claims.

f. Operation of the CP Energy Manager Controller

Figure 7A:
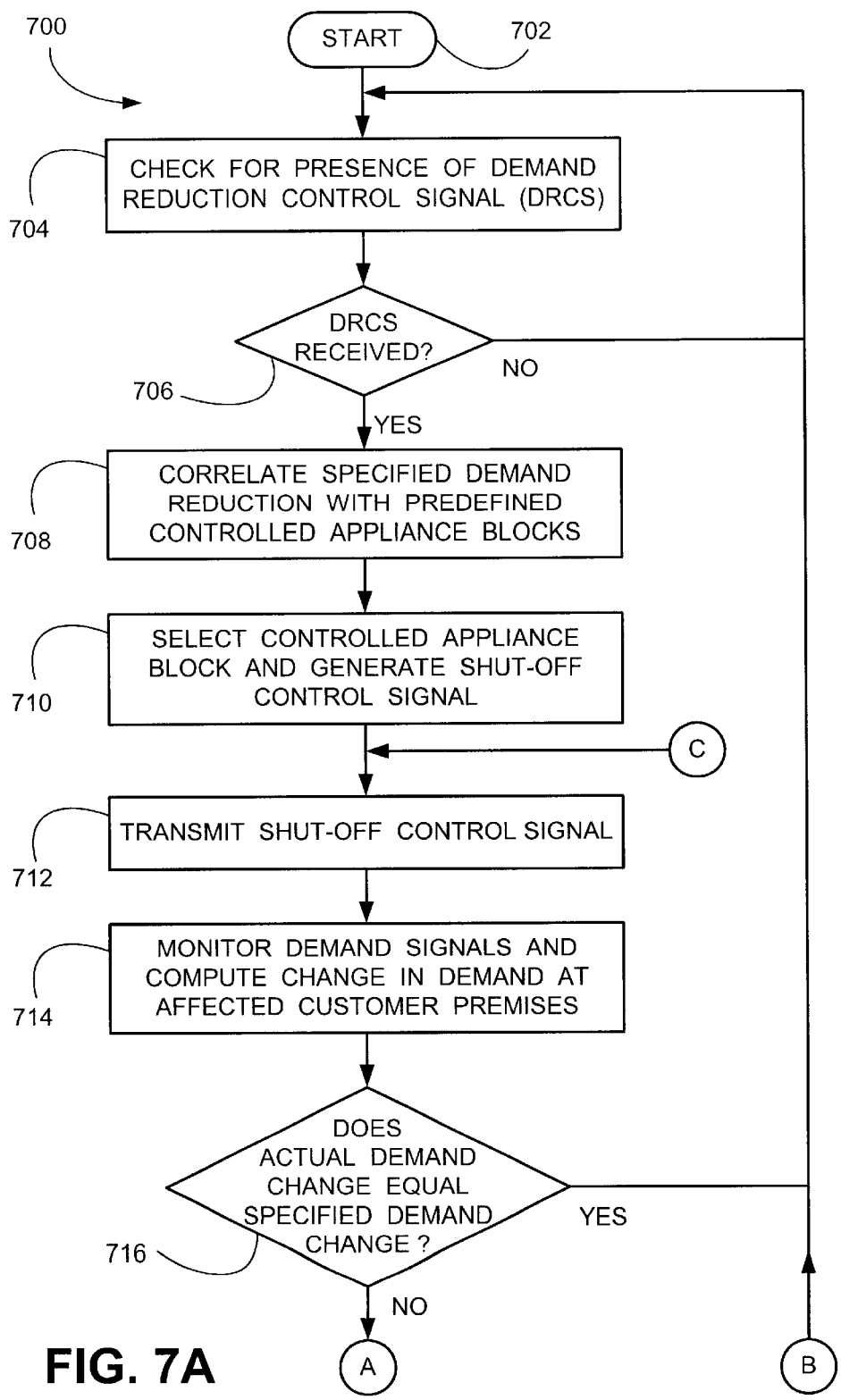
FIGS. 7A and 7B are flow charts illustrating a process for issuing a demand reduction control signal by the CP energy management controller of FIG. 3.
Figure 7B:
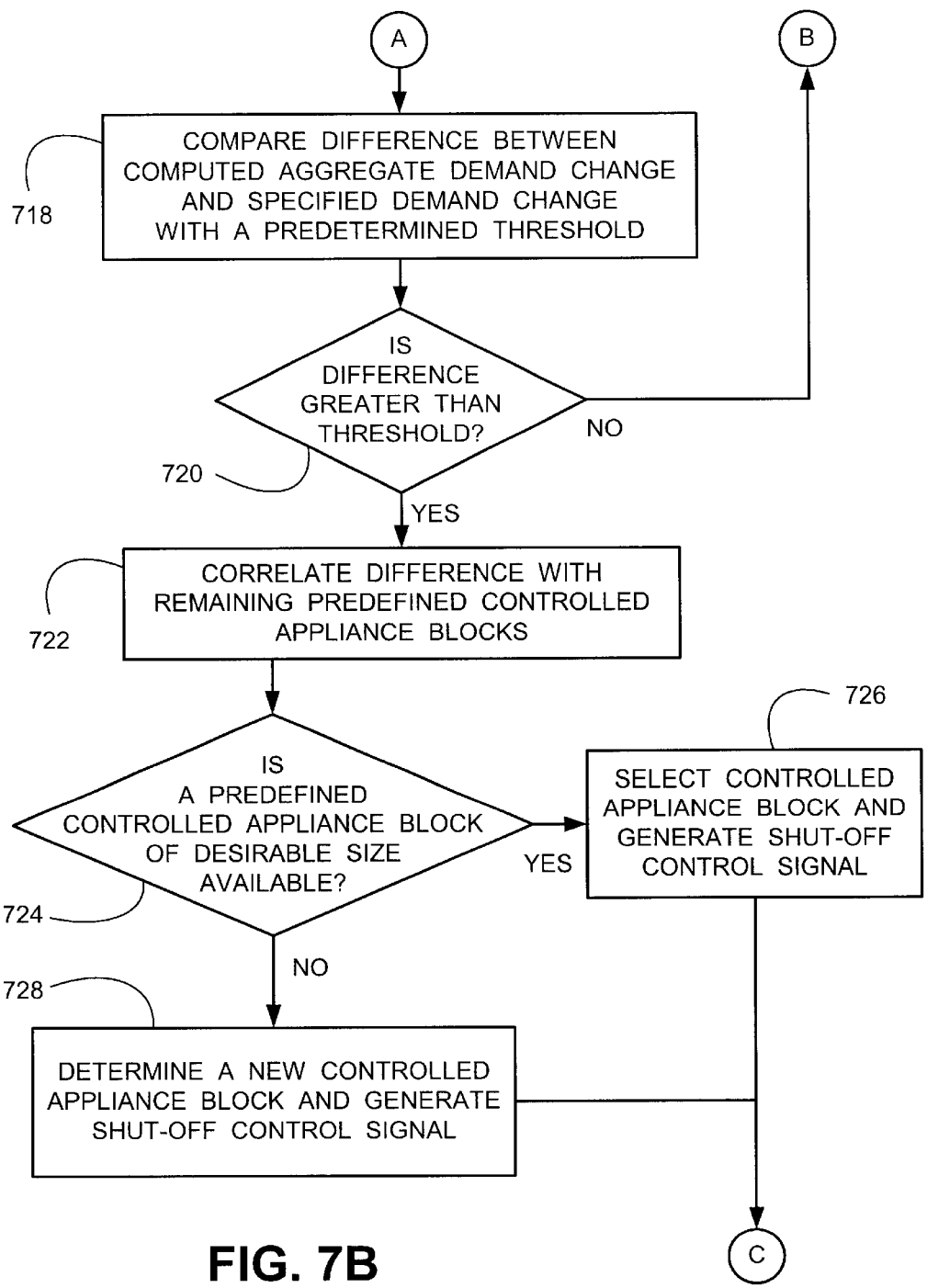

FIGS. 7A and 7B are flow charts illustrating a process for issuing a demand reduction control signal by the CP energy management controller 302 (FIG. 3). The flow charts of FIGS. 7A and 7B show the architecture, functionality, and operation of a possible implementation of the software for energy management controller logic 316 (FIG. 3). In this regard, each block may represent a module, segment, or portion of code, which comprises one or more executable instructions for implementing the specified logical function (s). It should also be noted that in some alternative implementations, the functions noted in the blocks may occur out of the order noted in FIGS. 7A and/or 7B, or may include additional functions, without departing significantly from the functionality of the process whereby the CP energy management controller 302 generates a demand reduction control signal. For example, two blocks shown in succession in FIGS. 7A and/or 7B may in fact be executed substantially concurrently, the blocks may sometimes be executed in the reverse order, or some of the blocks may not be executed in all instances, depending upon the functionality involved, as will be further clarified herein below. All such modifications and variations are intended to be included herein within the scope of this disclosure and to be protected by the accompanying claims.

The process starts at block 702. At block 704, processor 308 executes the energy management controller logic 316 residing in memory 310 (FIG. 3) to determine if the control room operators 304 have initiated a request for the CP energy management controller 302 to initiate a demand reduction control signal for transmission out onto the transceiver network 100 (FIG. 1). At block 706, if no demand reduction control signal (DRCS) has been received (the NO condition) the process returns back to block 704. One embodiment of the CP energy management controller 302 is configured to periodically perform a system check to determine if a demand reduction control signal has been requested by the control room operators 304. Another embodiment of the CP energy management controller 302 continually monitors for an incoming demand reduction control signal request from the operators on a real time basis. Yet another embodiment is responsive to an incoming demand reduction control signal request for the control room operators 304.

At block 706, once an incoming demand reduction control signal from the control room operators 304 has been detected (the YES condition), the process proceeds to block 708. In one embodiment, the demand reduction control signal includes information indicating the desired magnitude of demand reduction that is to be effected by the CP energy management controller 302. At block 708, the CP energy management controller 302 correlates the specific demand reduction with a plurality of predefined control appliance blocks. That is, the CP energy management controller 310 compares the specified demand reduction from the control room operators 304 against a plurality of predefined controlled appliance blocks having an estimated energy demand decrease, thereby determining which particular predefined controlled appliance block best corresponds to the magnitude of the specified demand reduction.

At block 710, the identified controlled appliance block is selected and the CP energy management controller 302 generates a shut-off control signal. The generated demand reduction control signal includes sufficient information such that all appliances associated with the selected controlled appliance block are identified. In one embodiment, the generated demand reduction control signal includes an individual listing of all identification numbers of the CP appliance controller units that are to shut off their controlled appliances. In another embodiment, a block identifier is included in the generated demand reduction control signal. The block identifier, in this embodiment, has been pre-specified into a plurality of CP appliance controller units by storing the block identifier in the CP appliance unit identifier 520 portion of memory 514 (FIGS. 5 and 6). A block identifier signal is particularly suitable for embodiments in which a large number of appliance are associated with a single predefined control appliance block and when the generated demand reduction control signal is of a short duration.

At block 712, the CP energy management controller 302 transmits the generated demand reduction control signal through the interface 312 over connection 306 (FIG. 3) for transmission out to the site controller(s). As described above, the demand reduction control signal is received by the designated CP appliance controller units such that the controlled appliances are shut off.

In one embodiment, a change in demand is detected by the transceivers that are coupled to the customer premises meters. This demand change is relayed back through the transceiver network 100 (FIG. 1) and is received by the CP energy management controller 302. That is, at block 714, the CP energy management controller 302 is monitoring return signals indicating the change in demand at the effected customer premises. In an alternative embodiment, additional information is provided back to the CP energy management controller 302 for analysis. For example, that CP appliance controller units that successfully implemented the specified shut off of its appliance may respond with an acknowledgment signal. Likewise, CP appliance controller units failing to complete the specified shut off of their respective appliance may indicate the failure to the CP energy management controller 302.

At block 714, once all of the transceivers monitoring the meters of the customer premises having CP appliance controller units designated as part of the selected controlled appliance block have responded with the metered demand change, a total change in metered demand is computed. That is, all of the individual metered demand changes are added together to determine an aggregate change in metered demand.

At block 716, the aggregate change in metered demand is compared with the specified demand reduction from the control room operators 304. If the aggregated metered demand change substantially equals the specified demand change from the control room operators 304 (the YES condition), the CP energy management controller 302 determined that a successful demand reduction has been implemented and that no further action is required. That is, the process proceeds back to block 704 to await for another incoming demand reduction request from the control room operators 304.

However, if at block 716, the actual demand change does not equal the specified demand change (the NO condition), the process proceeds to block 718. At block 718, a difference is determined between the computed aggregate demand change and the specified demand change from the control room operators 304. This difference is compared with a predetermined threshold. At block 720, if the difference is less than or equal to the threshold (the NO condition) the process returns back to block 704 to await another incoming demand reduction signal from the control room operators 304. That is, when the difference between the aggregate demand change and the specified demand change is less than a predefined threshold, the CP energy management controller 302 recognizes that an adequate demand reduction has been implemented. However, if the difference between the aggregate demand change and the specified change is greater than the predefined threshold (the YES condition) the process proceeds to block 722.

At block 722 the difference between the aggregate demand change and the specified demand change is compared with the remaining predefined controlled appliance blocks. At block 724 a determination is made whether or not there is another predefined controlled appliance block that has a desirable size (estimated demand reduction) available for initiating a further demand reduction. If another predefined controlled appliance block having a desirable size is identified (the YES condition), the controlled appliance block is selected and the CP energy management controller generates a demand reduction control signal for the selected second controlled appliance block. That is, the CP energy management controller 302 determines the effectiveness of the first implemented demand reduction and if the first implemented demand reduction is insufficient to meet the request of control room operators 304, the CP energy management controller 302 identifies a second controlled appliance block substantially equal to the deficit in the desired demand reduction and automatically initiates a demand reduction control signal for the second controlled appliance block.

In one embodiment, if no second controlled appliance block having a desirable size has been identified at block 724 (the NO condition), the process proceeds to block 728. At block 728 the CP energy management controller 302 selects a group of CP appliance controller units that, as a group, substantially equals the deficit in the desired demand reduction. Once identified, a new controlled appliance block is defined and the CP energy management controller 302 generates a demand reduction controlled signal to the newly defined controlled appliance block. In one embodiment, database 314 (FIG. 3) includes a list of CP appliance controller units that have not been assigned to a predefined controller appliance block. Thus, the CP energy management controller 302 merely selects from the group of unassigned CP appliance controller units to determine the newly controlled appliance block. In another embodiment, CP appliance controller units are reassigned from existing predefined controlled appliance blocks.

Once the second controlled appliance block, as determined at block 726 or block 728 is selected and the CP energy management controller 302 generates the appropriate demand reduction control signal, the process proceeds back to block 704 to await the next request for a system demand reduction from the control room operators 304. The above-described process is particularly advantageous in applications where a plurality of predefined controlled appliance blocks are available, and where it is desirable to provide flexibility to the control room operators 304 in implementing a reduction in system demand. That is, the control room operators 304 may iteratively request a series of incremental reductions in energy demand, thereby providing a great degree of control over demand reductions.

In another alternative embodiment, predefined controlled appliance blocks are not used. The database 314 residing in memory 310 of the CP energy management controller 302 (FIG. 3) includes a listing of all available CP appliance controller units and the amount of demand reduction that may be expected to be realized when the CP appliance controller unit shuts off its respective appliance. Here, the control room operators 304 specify a desired reduction in system demand. The CP energy management controller selects a sufficient number of CP appliance controller units from the database 314 and issues a demand reduction control signal to instruct the selected CP appliance controller units to shut off their respective appliances. The metered demand is relayed back through the transceiver network 100 to the CP energy management controller 302. Thus, the CP energy management controller 302 can determine the effectiveness of the initial demand reduction. The CP energy management controller 302 then evaluates the actual change in metered demand with the specified reduction in demand from the control room operators 304, and selects additional CP appliance controller units from the database 314 for a second round of demand reduction. The iterative process of issuing additional demand reductions is implemented by the CP energy management controller 302 until the actual reduction in metered demand substantially equals the specified reduction in system demand from the control room operators 304.

In another embodiment, the CP energy management controller 302, after determining the aggregate reduction in metered demand from the initial demand reduction control signal, determines whether or not the aggregate reduction in metered demand exceeds the predefined reduction in system demand requested by the control room operators 304. If the aggregate reduction in metered demand exceeded the amount requested by the control room operators 304, the CP energy management controller 302 would determine the amount that the aggregate metered demand exceeded the specified demand reduction, and then selects a number of CP appliance controller units that will be instructed to turn on their respective appliances. That is, if the magnitude of the demand reduction effected by the CP energy management controller 302 exceeds the requested reduction in demand, the CP energy management controller 302 simply selects a group of CP appliance controller units and instructs those selected CP appliance controller units to re-power their respective appliances.

Another alternative embodiment is configured to automatically rotate the controlled appliance blocks in a sequential manner such that any individually controlled appliance block is not maintained in the shut off state for an unreasonable amount of time. For example, the control room operators 304 may request the CP energy management controller 302 to implement a 100 MW reduction in demand for one hour. The CP energy management controller 302 would identify four controlled appliance blocks of approximately 100 MW each, and then sequentially generate a demand reduction control signal to each one of the identified four controlled appliance blocks. Any one individual controlled appliance block is shut off for only fifteen minutes. One skilled in the art will appreciate that CP energy management controller 302 can be configured to provide any degree of flexibility in rotating predefined controlled appliance blocks to prevent any one individual controlled appliance block from being shut off for an unreasonable amount of time. Another embodiment of the CP energy management controller rotates individual CP appliance controller units in accordance with information residing in database 314 as needed.

One skilled in the art will appreciate that the CP energy management controller may be configured in an infinite number of operating modes to provide the control room operators 304 any desired degree of control and flexibility. The control room operators 304 simply communicate their request to the CP energy management controller 302 through the control console 322. The CP energy management controller executes the energy management controller logic 316 to implement the specified demand reduction.

When the energy management controller logic 316 is implemented as software and stored in memory 310 (FIG. 3), one skilled in the art will appreciate that the energy management controller logic 316 can be stored on any computer-readable medium for use by or in connection with any computer and/or processor related system or method. In the context of this document, a memory 310 is a computer readable medium that is an electronic, magnetic, optical, or other another physical device or means that contains or stores a computer and/or processor program. The energy management controller logic 316 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with the energy management controller logic 316. In the context of this specification, a "computer-readable medium" can be any means that can store, communicate, propagate, or transport the program associated the energy management controller logic 316 for use by or in connection with the instruction execution system, apparatus, and/or device. The computer-readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with the energy management controller logic 316 is printed, as the program can be electronically captured, via, for instance optical scanning of the paper or other medium, then compiled, interpreted or otherwise processed in a suitable manner if necessary, and then stored in memory 310.

g. Termination of the Demand Reduction Control Signal

When the operators have determined that the demand reduction is no longer required, the CP energy management controller 302 generates and transmits a termination command of the demand reduction control signal out to the effected CP appliance controller units. That is, once the control room operators 304 have determined that a reduction in system demand is no longer required. Thus, the CP energy management controller 302 releases control of all of the effected appliances such that the effected appliances then operate in accordance with their normal operating procedures.

When the operators have determined that the reduction in system demand is no longer required, or have determined that the magnitude of the previously specified reduction in system demand may be decreased, one embodiment of the CP management controller 302 is configured to implement a "soft termination" of the demand reduction control signal. While the other embodiments described above, due to the statistical nature of appliances controlled by the CP appliance controller units, a termination of the demand reduction control signal may result in an increase in system demand exceeded the initial system demand reduction. For example, consider a hypothetical scenario wherein one hundred air conditioning units were defined in a first controlled appliance block. The demand reduction control signal would shut off each of the one hundred individually controlled air conditioning units. However, at the time of the initiation of the demand reduction control signal, only eighty of the air conditioning units may have been in actual operation due to the statistical nature of an air conditioning load which cycles on and off in accordance with a variety of parameters such as compressor pressure and/or thermostat settings. However, during the duration of time that the demand reduction control signal was in effect, the temperature inside the customer premises cooled by the one hundred air conditioning units may have all increased such that the thermostat to each air conditioning unit is requesting the air conditioning units to be on to provide cool conditioned air. Thus, when the demand reduction control signal is terminated by the CP energy management controller 302, all one hundred of the air conditioning units would turn on. That is, only eighty air conditioning units were initially shut off, yet all one hundred air conditioning units turned on when the demand reduction control signal was terminated. Thus, in previously described embodiments, the increase in system demand may be greater than anticipated when the demand reduction control signal is terminated.

In one embodiment, the CP energy management controller 302 is configured to incrementally terminate the demand reduction control signal to the effected CP appliance controller units such that any unexpected overshoot in demand increases are avoided. For the above-described example, the CP energy management controller 302 would terminate the demand reduction control signal to only approximately eighty of the one hundred air conditioning units. The shut-off control signal to the remaining twenty air conditioning units would be postponed for some predefined period of time before those twenty air conditioning units are allowed to turn back on. That is, a soft termination of the demand reduction control signal is effected.

h. Operation of the CP Appliance Controller Unit

Figure 8:
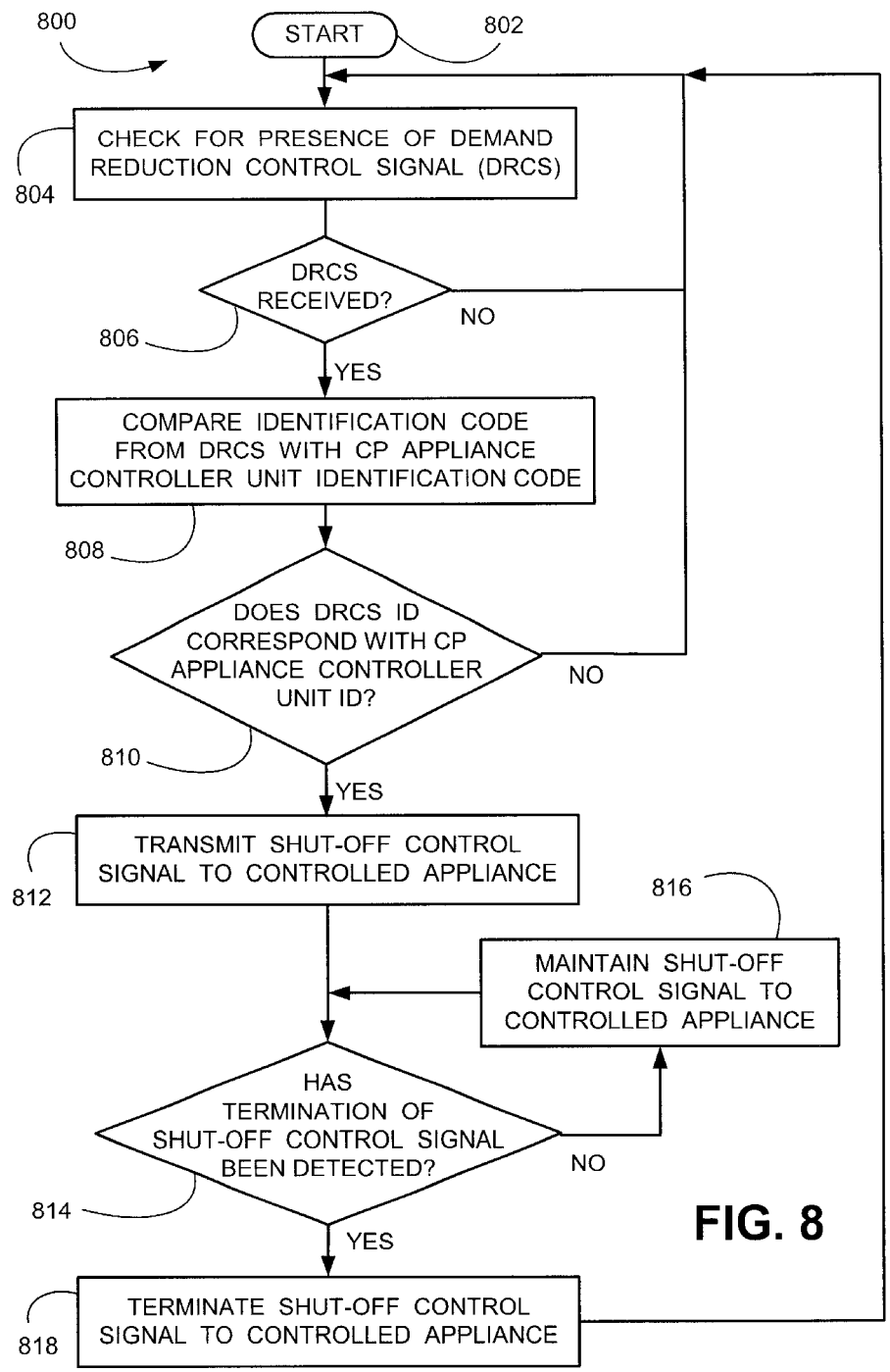
FIG. 8 is a flow chart illustrating a process for receiving a demand reduction control signal by the CP appliance controller unit of FIGS. 5 and 6.

FIG. 8 is a flow chart 800 illustrating a process for receiving a demand reduction control signal by the CP appliance controller units 500 and 600 (FIGS. 5 and 6, respectively). The flow chart of FIG. 8 shows the architecture, functionality, and operation of a possible implementation of the software for implementing the CP appliance controller logic 516 (FIG. 5). In this regard, each block may represent a module, segment, or portion of code, which comprises one or more executable instructions for implementing the specified logical function(s). It should also be noted that in some alternative implementations, the functions noted in the blocks may occur out of the order noted in FIG. 8 or may include additional functions without departing significantly from the functionality of the CP appliance controller units 500 and 600. For example, two blocks shown in succession in FIG. 8 may in fact be executed substantially concurrently, the blocks may sometimes be executed in the reverse order, or some of the blocks may not be executed in all instances, depending upon the functionality involved, as will be further clarified herein below. All such modifications and variations are intended to be included herein with the scope of this disclosure and to be protected by the accompanying claims.

At block 806, a determination is made whether or not a DRCS has been received. If not (the NO condition), the process proceeds back to block 804. If a DRCS has been received at block 806 (the YES), the process proceeds to block 808.

At block 808 the identification code associated with the CP appliance controller unit 500 or 600 is compared with identification code information included as part of the received demand reduction control signal. That is, the demand reduction control signal will include an identification code designating which CP appliance controller units are to be actuated to shut off their respective controlled appliances. This received information is compared with the CP appliance controller unit identification code. At block 810, a determination is made whether or not the identification code of the CP appliance controller unit 500 or 600 corresponds with the demand reduction control signal identification code. If the identification codes do not match (the NO condition), the process proceeds back to block 804. That is, if the identification code of the received demand reduction control signal does not match with the identification code of the CP appliance controller unit the processor 502 recognizes that its controlled appliance is not to be shut off. Then the CP appliance controller unit continues to wait for another incoming demand reduction control signal which will be analyzed according to the process described above.

If at block 810 the identification code contained in the received demand reduction control signal matches with the identification code of the CP appliance controller unit 500 or 600, (the YES condition) the process proceeds to block 812. At block 812, processor 502 generates a shut-off control signal such that the controlled appliance is shut off. Thus, the CP appliance controller unit 500 or 600 monitors incoming demand reduction control signals, and if the identification codes in the demand reduction control signal and the CP appliance controller match, the processor 502 recognizes that it is to shut off its respective controlled appliance.

At block 814 the CP appliance controller unit 500 or 600 awaits reception of a control signal generated by the CP energy management controller 302 to determine whether or not the shut-off control signal is to be terminated. Similar to the process described in blocks 806, 808 and 810, at block 814 the identification codes contained in any received termination signals are compared with the identification codes of the CP appliance controller unit 500 or 600 to determine if the termination signal is intended to be implemented by that CP appliance controller unit 500 or 600. For convenience of illustration, and because such a process is readily apparent to one skilled in the art, blocks describing this functionality in detail are not illustrated in FIG. 8 for convenience.

If at block 814 a determination is made that the received termination signal does not apply to the CP appliance controller unit 500 or 600 (the NO condition) the process proceeds to block 816. At block 816 the CP appliance controller unit 500 or 600 maintains the shut-off control signal to the controlled appliance such that the controlled appliance remains shut off. However, if the received termination signal indicates that the CP appliance controller unit 500 or 600 is to terminate the shut off, processor 502 provides a control signal such that the CP appliance controller unit 500 or 600 no longer imposes a shut-off control signal to the controlled appliance. That is, the CP appliance controller unit recognizes that the need for a demand reduction from the controlled appliance is no longer required, and therefore allows the controlled appliance to operate in its normal mode of operation.

After the appliance shut-off control signal to the controlled appliance has been terminated at block 818, the process proceeds back to block 804. Thus, the CP appliance controller unit 500 or 600 awaits their next incoming demand reduction control signal to determine if the CP appliance controller unit 500 or 600 should shut off its controlled appliance.

When the CP appliance controller logic 520 is implemented as software and stored in memory 514 (FIGS. 5 and 6), one skilled in the art will appreciate that the CP appliance controller logic 520 can be stored on any computer-readable medium for use by or in connection with any computer and/or processor related system or method. In the context of this document, a memory 514 is a computer-readable medium that is an electronic, magnetic, optical, or other another physical device or means that contains or stores a computer and/or processor program. CP appliance controller logic 520 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with the CP appliance controller logic 520. In the context of this specification, a "computer-readable medium" can be any means that can store, communicate, propagate, or transport the program associated the CP appliance controller logic 520 for use by or in connection with the instruction execution system, apparatus, and/or device. The computer-readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program associated with the CP appliance controller logic 520 is printed as the program can be electronically captured, via, for instance, optical scanning of the paper or other medium, then compiled, interpreted or otherwise processed in a suitable manner if necessary, and then stored in memory 514.

i. Transceiver Maintenance Feature

One embodiment described above employs transceivers configured to transmit information back to the CP energy management controller 302 (FIG. 3). Location information for each transceiver in a CP appliance controller unit, and/or each transceiver coupled to a meter, resides in database 314 (FIG. 3). Transceivers configured to transmit information back to the CP energy management controller 302, in one embodiment, are configured to include logic that indicates the operational status of the CP appliance controller unit and/or its associated components back to the CP energy management controller 302. The energy management controller logic 316 (FIG. 3) includes a transceiver maintenance function that evaluates received status and information from the signals transmitted by the transceivers such that the operational integrity of the CP appliance controller unit is accessed. That is, if a component in the CP appliance controller unit fails, the status information indicates failure of that component. The energy management controller logic 316 provides the appropriate indication to the control room operators 304 such that maintenance personnel are dispatched out to the CP appliance controller unit to effect a repair of the non-functioning or improperly functioning component.

One embodiment employing the above-described maintenance feature employs transceivers configured to periodically transmit status information to the CP energy management controller 302 at predefined time intervals. Another embodiment employs transceivers configured to respond to a status information request generated by the CP energy management controller 302. Here, logic residing in the energy management controller logic 316 would perform a maintenance function wherein pre-selected transceivers are requested to provide status information. Another embodiment employs transceivers configured to generate periodic status reports to the CP energy management controller 302 and are configured to respond to requests for status information from the CP energy management controller 302. In yet another embodiment, all three types of the above-described transceivers are employed to communicate status information to the CP energy management controller 302.

When the transceiver components that broadcast the status information fails, such as, but not limited to, the CP appliance unit transceiver 506, antenna 512, connection 526 and/or connection 528, the failure is detected by a loss of signal. Thus, in an embodiment employing a transceiver that is to provide an acknowledgement signal, or provide a status signal in response to a status information request, or is to provide periodic status information reports, the failure of the transceiver to respond or provide information at scheduled times and/or in response to a status inquiry indicates a component failure.

Summarizing, the above-described embodiment includes a maintenance functionality such that the operational status of the transceivers residing in the transceiver network 100 (FIG. 1) are monitored to ensure continuous operational functionality. Other components of the above-described communication network, such as the transceiver units and the site controllers, may be also monitored. Thus, a detected failure in a transceiver or a transceiver component may be quickly detected such that maintenance personnel are dispatched to repair the failed components or transceiver. This embodiment is particularly advantageous in providing an intelligent network demand control system having a high degree of operational reliability and integrity.

j. Defining Transceiver Communication Paths

For convenience describing the operation and functionality of the transceiver network 100 (FIG. 1), a simplified description of the communication paths employed by the plurality of transceivers is described above. In one embodiment, all transceivers employed in the transceiver network have both capability to receive broadcasted signals and to transmit broadcast signals. However, many of the transceivers have a limited transmit signal range as the strength of the broadcasted signal is relatively low. This embodiment is particularly suited in transceiver network 100 configurations employing a large number of transceivers located in close proximity to other transceivers.

The communication path that a transceiver employs for broadcasting signals is predefined. For example, transceiver 122 in FIG. 1 was described above as transmitting, and receiving, broadcast signals with transceiver unit 106 over the path defined by signal 128, 142 and 144. That is, when the transceiver unit 106 transmits a demand reduction control signal to transceiver 122, transceiver stations 138 and 134 are configured to relay the signal to transceiver 122. Here, if the transceiver station 158 detects the demand reduction control signal to transceiver 122, transceiver station 158 simply ignores the detected signal and does not relay the signal.

In one embodiment, transmission paths for all receivers are predetermined by the CP energy management controller 302 (FIG. 3). Path information is broadcasted out to all components of the transceiver network 100, transceiver stations, transceiver units and site controllers. Each component then configures itself to react only to those signals for which it is part of the predefined path. Thus, when the transceiver unit 106 transmits a demand reduction control signal to transceiver 122, transceiver unit 170 recognizes that it is not part of the path to transceiver 122, and simply takes no action.

In one embodiment, the communication paths are defined by using the identification codes associated with each transceiver, and identification codes assigned to the transceiver stations, transceiver units and site controllers. For example, if site controller 110 is defined by the identification code 110, transceiver unit 106 is defined by the identification code 106, transceiver station 138 is defined by the identification code 138, transceiver station 134 is defined by the identification code 134, and transceiver 122 is defined by the identification code 122, the path between the site controller 110 and transceiver 122 is simply defined by a code such as 110.106.138.134.122 (where each number corresponds to the component identification code). One skilled in the art will appreciate that other suitable codes are easily defined.

Such a system is described in detail in the commonly assigned patent entitled "MULTI-FUNCTION GENERAL PURPOSE TRANSCEIVER," filed Mar. 18, 1999, and accorded Ser. No. 6,233,327B1, issued on May 15, 2001 and incorporated herein by reference in its entirety.

In one embodiment of the intelligent network demand control system, failure of a transceiver or a transceiver component is detected in a manner described above. When such a failure is detected, communications with other transceivers may be disrupted if the failed transceiver or transceiver component is in the communication path of other transceivers. In such a situation, upon the detection of the failed transceiver or transceiver component, the CP energy management controller redefines communication paths for affected transceivers, and transmits the redefined paths out to the transceivers, transceiver stations, transceiver units and site controllers such that the paths are redefined. For example, transceiver station 134 (FIG. 1) may fail. Thus, transceivers 122, 124 and 126 (FIG. 1) will not be in communication with the CP energy management controller 302 (FIG. 3). The communication path for transceiver 122 would then be redefined such that transceiver 122 is communicating with transceiver 152 (assuming that transceiver 152 is sufficiently close to transceiver 122 to detect signals broadcasted from transceiver 122). Thus, transceiver 122 would be in communication with the transceiver unit 106 (FIG. 1) through a newly defined path indicated by the signals 174, 162, 168 and 144 (FIG. 1).

Similarly, the communication path for transceiver 124 would then be redefined such that transceiver 124 is communicating with transceiver 122 (assuming that transceiver 122 is sufficiently close to transceiver 124 to detect signals broadcasted from transceiver 124). Thus, transceiver 124 would be in communication with the transceiver unit 106 through a newly defined path indicated by the signals 176, 174, 162, 168 and 144 (FIG. 1).

Similarly, the communication path for transceiver 126 would then be redefined such that transceiver 126 is communicating with transceiver 124 (assuming that transceiver 124 is sufficiently close to transceiver 126 to detect signals broadcasted from transceiver 126). Thus, transceiver 126 would be in communication with the transceiver unit 106 through a newly defined path indicated by the signals 178, 176, 174, 162, 168 and 144 (FIG. 1).

One skilled in the art will appreciate that the possible communication paths in a transceiver network 100 are nearly limitless, and that such communication paths are easily redefined by the CP energy management controller 302. The above described examples are intended to illustrate some of the alternative redefined communication paths to explain the operation and functionality of the maintenance feature of one embodiment of the intelligent network demand control system.

k. Alternative Embodiments of the Intelligent Network Demand Control System

For convenience of describing the operation and functionality of the CP energy management controller 302 (FIG. 3), an integral part of the intelligent network demand control system, the CP energy management controller 302 was illustrated as a stand-alone unit. The CP energy management controller 302, in an alternative embodiment, may be implemented as an integral component of an energy management system and/or a SCADA system without departing substantially from the operation and functionality of the intelligent network demand control system.

Furthermore, the components illustrated as residing in the CP energy management controller 302 may reside in alternative convenient locations outside of the CP energy management controller 302 without adversely affecting the operation and functionality of the intelligent network demand control system. Such components may even be integrated with other existing components residing in the energy delivery system control center, thereby minimizing the cost of implementing an intelligent network demand control system.

For example, the database 314 residing in the memory 310 (FIG. 3) may be implemented in a memory unit residing in an alternative location, such as the control console 322, the energy management system 332, or the SCADA system 328 (FIG. 3). Thus, metered demand information provided by the intelligent network demand control system could simply be transferred to a database residing in the alternative location.

Similarly, the energy management controller logic 316 (FIG. 3) could reside in a convenient alternative location and be executed by a different processor that resides in a convenient alternative location. Also, the interface 312 may be implemented as a stand-alone interface unit residing in a convenient location. For example, interface 312 may be implemented as a stand-alone PC, a network PC, a dedicated intranet-network interface or the like that performs the functionality of receiving information through a communication network from the site controller 110 (FIGS. 1 and 2).

For convenience of describing the operation and functionality of the CP energy management controller 302 (FIG. 3), an integral part of the intelligent network demand control system, the CP energy management controller 302 was illustrated as a stand-alone unit residing within the energy delivery system control center. Another embodiment of the CP energy management controller 302 resides in an alternative convenient location outside of the energy delivery system control center. In such an embodiment, connection 324 may be a connection of suitable length to provide connectivity between processor 308 and the control console 322. In other embodiments, connection 324 may include a plurality of components that provides connectivity over a special purpose network or an existing, general purpose network. For example, the CP energy management controller 302 could be in communication with the control center energy delivery system over any one of the communication systems described above and illustrated in FIG. 4. Such a configuration is easily implemented using appropriate interface components. Such interface components residing in a CP energy management controller 302 and an energy delivery control system that are configured to transmit, receive and convert signals are well known in the art and, therefore, are not described in detail herein other than to the extent necessary to understand the operation and functioning of these components when employed as part of the intelligent network demand control system that is remote from the energy delivery system control center. One skilled in the art will realize that such well known components are too numerous to describe in detail herein, and that any configuration of such well known components having the above-described functionality may be implemented without departing substantially from the intelligent network demand control system.

An alternative embodiment of the CP appliance controller unit, configured substantially in accordance with the CP appliance controller unit 500 (FIG. 5), is further configured to provide a plurality of output control signals to a plurality of appliances to which the CP appliance controller unit 500 is coupled to. For example, CP appliance controller unit may be coupled to three appliances. The appliance controller would provide three output connections, or the single output connection would be coupled to all three appliances, such that a single shut-off signal generated by the processor would concurrently shut off all three appliances. Alternatively, the plurality of appliances coupled to the CP appliance controller unit, in another embodiment, each have an associated unique identification code such that a single CP appliance controller unit may determine which individual appliances are to be shut off when the demand reduction control signal is received from the CP energy management controller 302 (FIG. 3). Here, the demand reduction control signal received from the CP energy management controller 302 contains appliance identification codes such that the CP appliance controller unit determines which appliances to shut off. Furthermore, an embodiment of a CP appliance controller unit may be easily configured substantially in accordance with the CP appliance controller unit 600 (FIG. 6) by simply providing a plurality of receptacles to which the controlled appliances will be plugged into to receive electrical power through the CP appliance controller unit. Such an embodiment having a plurality of receptacles may be configured to shut all appliances off as a group, or may be configured to select individual appliances for shutting off in the manner described above.

The embodiment of the intelligent network demand control system was described herein to include a plurality of transceiver units configured to communicate based upon a predefined communication path specified by the CP energy management controller 302. An alternative embodiment is configured to communicate with other special purpose systems that employ compatible transceivers. For example, a system for monitoring emergency, alarm, climate, or other conditions in a defined territory is disclosed in the co-pending commonly assigned non-provisional application entitled "SYSTEM FOR MONITORING CONDITIONS IN A RESIDENTIAL LIVING COMMUNITY," filed Mar. 18, 1999, and accorded Ser. No. 09/271,517, incorporated herein by reference in its entirety. The above application describes a computerized system for monitoring emergency, alarm, climate and/or other conditions in a defined territory using a network of transceivers communicating back to a remote facility via a plurality of repeaters and a central system (such as a site controller). The plurality of transceivers configured for monitoring emergency, alarm, climate and/or other conditions in a defined territory are integrated with a plurality of transceivers for controlling customer premises appliances, thereby reducing overall facility, maintenance and installation costs by employing common units. For example, a transceiver controlling an air conditioning unit, a transceiver monitoring metered demand and a transceiver monitoring an alarm (in accordance with the Ser. No. 09/271,517 Application) may be integrated to communicate through same transceiver stations, transceiver units and/or site controllers. The integrated system would simply recognize the device that is monitored or controlled by any particular transceiver and appropriately route communications to and/or from that transceiver to the appropriate remote facility. One skilled in the art will appreciate that an intelligent network demand control system described herein is interpretable into any other special purpose system or a multipurpose system based upon a network of similarly configured transceivers that communicate through common components.

An alternative embodiment of the CP appliance controller unit, configured substantially in accordance with the CP appliance controller unit 500 (FIG. 5), is further configured to provide a thermostat setting control signal to a thermostat controlling a air conditioning unit, heating unit, heat pump unit or the like. The thermostat control signal adjusts the setting of the thermostat such that the unit controlled by the thermostat shuts off when a demand reduction control signal is received by the CP appliance controller unit. In one embodiment, the thermostat control signal resets the thermostat's temperature setting to a predefined value. Such an embodiment may be particularly useful in shutting off a controlled unit while maintaining a temperature threshold at which the thermostat may override a shut-off signal provided by the CP appliance controller unit. For example, during the summer cooling season, the predefined thermostat setting that the thermostat is reset to when a demand reduction control signal is received may be selected to be 85 degrees Fahrenheit (° F.). When the demand reduction control signal is received by the CP appliance controller unit, a thermostat setting control signal adjusts the thermostat setting to 85° F. Should the ambient temperature monitored by the thermostat exceed 85° F., then the demand reduction control signal is overridden such that the air conditioning unit is activated so that ambient temperature does not substantially exceed 85° F. During the winter heating season, the predefined thermostat setting may be selected to be, for example, 70 degrees Fahrenheit (° F.). When the demand reduction control signal is received by the CP appliance controller unit, a thermostat setting control signal adjusts the thermostat setting to 70° F. Should the ambient temperature monitored by the thermostat decrease below 70° F., then the demand reduction control signal is overridden such that the heating unit is activated so that ambient temperature does not substantially decrease below 70° F.

Figure 9:
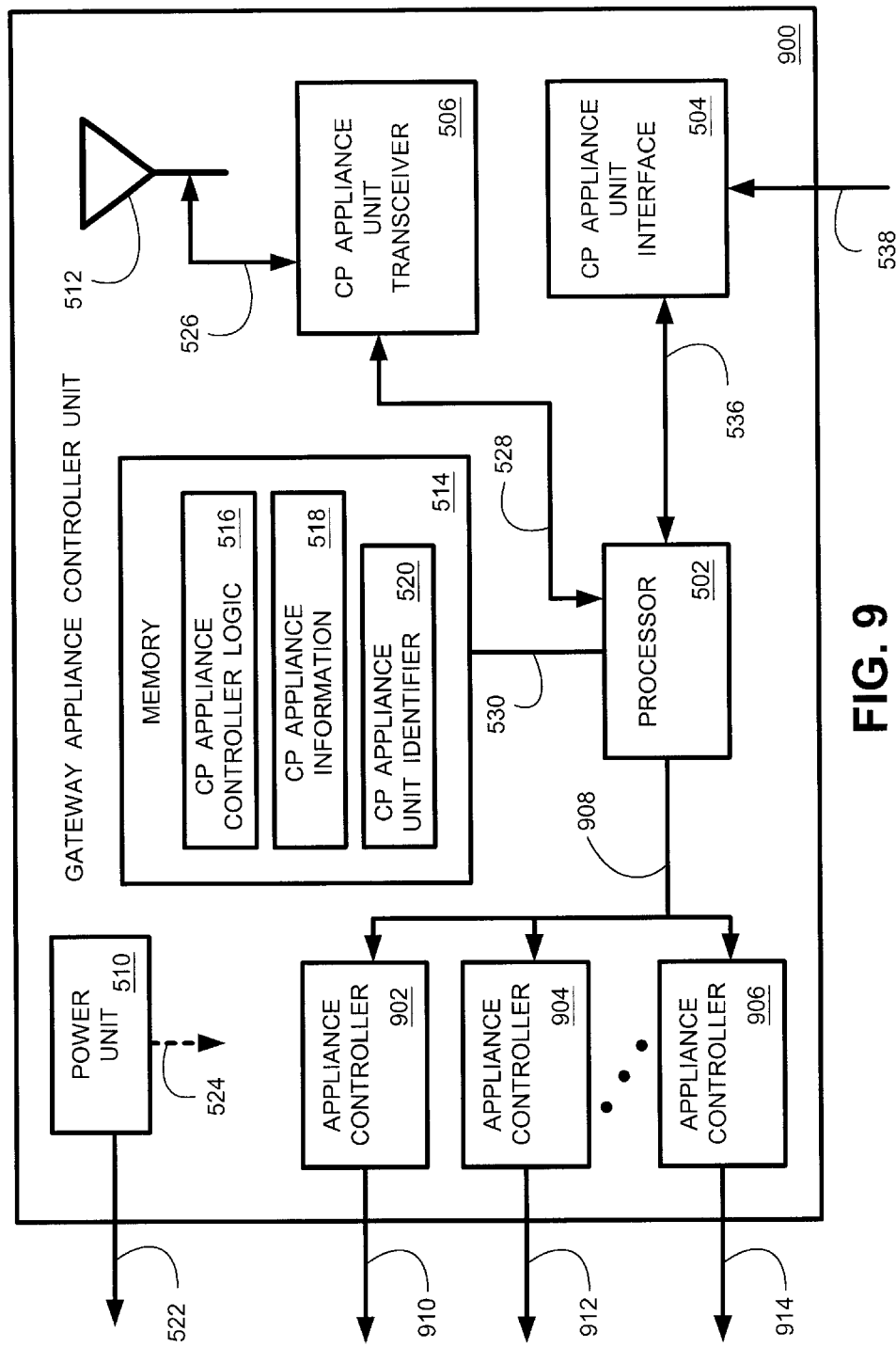
FIG. 9 is a block diagram illustrating an alternative embodiment of a gateway appliance controller unit.

FIG. 9 is a block diagram illustrating an alternative embodiment of a gateway appliance controller unit 900. Components residing in the gateway appliance controller unit 900 that are similar to, or identical to, the components residing in the CP appliance controller unit 500 (FIG. 5) employ the same reference number and are not described again in detail herein. That is, the gateway appliance controller unit 900 is configured substantially similar to the CP appliance controller unit 500 and has substantially similar operational and functionality characteristics as the CP appliance controller unit 500. However, the gateway appliance controller unit 900 is configured for conveniently controlling a plurality of appliances that are coupled to a single gateway appliance controller unit 900.

The gateway appliance controller unit 900 includes a plurality of appliance controllers 902, 904 and 906. Processor 502 provides a shut-off control signal to the appliance controllers 902, 904 and 906, via connection 908. For convenience of illustration, connection 908 is shown as a single connection from processor 502 that branches out to the plurality of appliance controllers 902, 904 and 906. However, processor 502 could employ individual connections to each of the plurality of appliance controllers 902, 904 and 906. Appliance controllers 902, 904 and 906 are coupled to at least one appliance via connections 910, 912 and 914, respectively. The appliance controllers 902, 904 and 906 operate substantially in accordance with the above-described appliance controller 508 (FIG. 5). Alternatively, one or more of the plurality of appliance controllers 902, 904 and/or 906 may be configured to operate substantially in accordance with the CP appliance controller power switch 614 (FIG. 6). Furthermore, one or more of the plurality of appliance controller units 902, 904 and/or 906 may be configured to control a plurality of appliances, directly and/or indirectly.

When a demand reduction control signal is received by the gateway appliance controller unit 900, information is provided such that processor 502 determines which of the plurality of appliance controllers 902, 904 and/or 906 are to be operated such that their controlled appliance is shut off. For example, a demand reduction control signal may indicate that only appliance controllers 902 and 906 are to shut off their respective appliances. Thus, a later received incoming demand reduction control signal could include information such that appliance controller 904 is to shut off its controlled appliance. Alternatively, a received demand reduction control signal could specify any combination of identification information to identify selected appliance controllers that are to be instructed to shut off their controlled appliances. Similarly, incoming control signals requesting a termination of the demand reduction control signal can be tailored to selectively be addressed to specified appliance controllers.

The gateway appliance controller unit 900 is particularly advantageous in applications where it is desirable to control a plurality of appliances from a single centralized location. For example, the gateway appliance controller unit 900 may be particularly applicable for controlling a single factory or a portion of a single factory, such as an assembly line.

Figure 10:
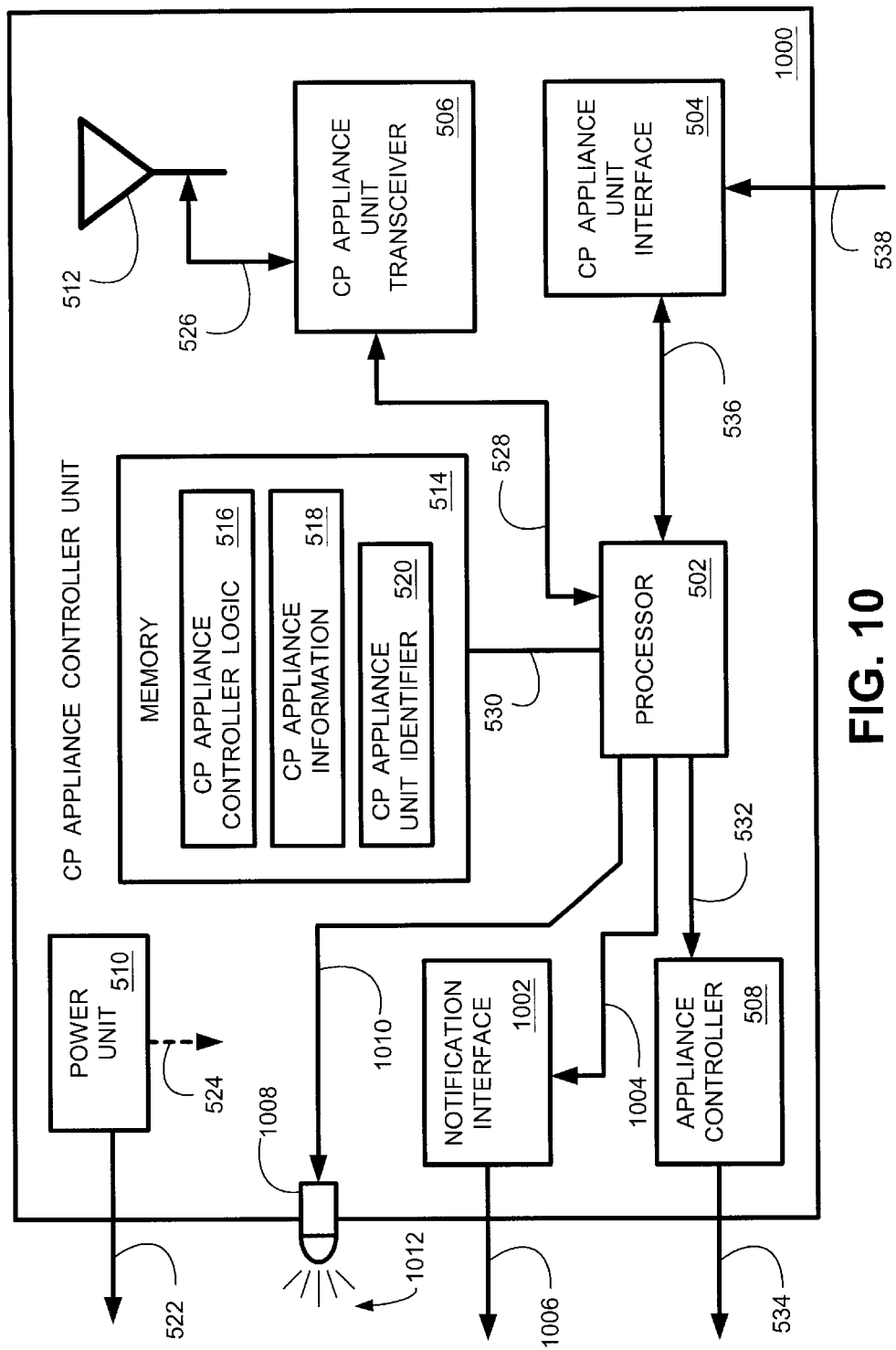
FIG. 10 is a block diagram illustrating an alternative embodiment of a CP appliance controller unit configured to provide notification that the CP appliance controller unit has received and implemented a demand reduction control signal to its controlled appliances.

FIG. 10 is a block diagram illustrating an alternative embodiment of a CP appliance controller unit 1000 configured to provide notification that the CP appliance controller unit 1000 has received and implemented a demand reduction control signal to its controlled appliances. Components residing in the CP appliance controller unit 1000 that are similar to, or identical to, the components residing in the CP appliance controller unit 500 (FIG. 5) employ the same reference number and are not described again in detail herein. That is, the CP appliance controller unit 1000 is configured substantially similar to the CP appliance controller unit 500 and has substantially similar operational and functionality characteristics as the CP appliance controller unit 500. However, the CP appliance controller unit 1000 is configured to notify the effected customer that the CP appliance controller unit 1000 has operated to shut off its controlled appliance.

When a demand reduction control signal is received by the CP appliance controller unit 1000 and a shut-off control signal is generated such that the appliance controller 508 shuts off its controlled appliance, processor 502 generates a notification signal. In one embodiment, the notification signal is provided to the notification interface 1002, via connection 1004. Notification interface 1002 is configured to provide a suitably formatted notification communication signal over connection 1006 such that the customer is notified that the controlled appliance has been shut off. One non-limiting example of the notification interface 1002 is an embodiment that provides a suitably formatted notification communication signal that is transmitted through a conventional public switched telephone network. Another non-limiting example of an embodiment of the notification interface 1002 is an embodiment that provides a suitably formatted notification communication signal in a digital format or the like that is transmitted to a PC or other similar processor. For example, such a notification communication signal could be provided directly to a PC or be provided into a networked system such as an Intranet or an Internet network. Yet another non-limiting example of an embodiment of the notification interface 1002 transmits a conventional radio frequency (RF) signal to a transceiver to provide the notification to the customer. A non-limiting example of a transceiver configured to receive a broadcasted notification communication signal is a conventional pager or a special purpose pager.

One skilled in the art will appreciate that the notification interface 1002 may be configured to provide a suitable notification communication signal to any conventional communication system. Therefore, the specific components (not shown) residing in the notification interface 1002 that are configured to transmit a suitable notification communication signal to any particular conventional communication system are well known in the art and, therefore, are not described in detail herein other than to the extent necessary to understand the operation and functioning of the notification interface 1002 when employed as part of the CP appliance controller unit 1000. One skilled in the art will realize that such well known components are too numerous to describe in detail herein, and that any configuration of such well known components having the above-described functionality may be implemented in the notification interface 1002 without departing substantially from the operation and functionality of the CP appliance controller unit 1000 as described above. Any such implementation of the components of a notification interface 1002 are intended to be within the scope of this disclosure and to be protected by the accompanying claims.

Alternatively, processor 502 may provide a notification signal that actuates a light 1008. For example, the notification signal may simply be a suitable voltage over connection 1010 such that the light 1008 turns on and emits light 1012 that is visible to a customer. That is, when the customer sees the light 1012 emanating from the light 1008, the customer realizes that the controlled appliance has been shut off. Alternatively, a suitable audio signal may be provided over connection 1010 such that a conventional speaker (not shown) provides an audible notification signal to the customer.

For convenience of illustration, and for explaining the operation and functionality of the CP appliance controller unit 1000, the notification interface 1002 and the light 1008 were described as residing together in the CP appliance controller unit 1000. Alternative embodiments may employ a single notification device. For example, the CP appliance controller unit 1000 may be limited to the light 1008. Such an embodiment is particularly advantageous in providing lower cost CP appliance controller units 1000.

An alternative embodiment of the CP appliance controller unit 1000 is configured to receive a pre-notification demand reduction control signal that is generated by the CP energy management controller 302 (FIG. 3). The pre-notification demand reduction control signal is generated in a similar manner as the demand reduction control signal. However, the pre-notification demand reduction control signal does not include instructions directing the receiving CP appliance controller unit 1000 to shut off its controlled appliance. Such an embodiment is particularly advantageous when the control room operators 304 (FIG. 3) realize that at a known future time a demand reduction will be requested of the CP appliance controller units.

For example, the control room operators 304 may be notified that a generation unit will be coming off-line or that a purchase of energy from another entity will be terminated in approximately one hour. The control room operators 304 then request the CP energy management controller 302 (FIG. 3) to generate and transmit out onto the network a pre-notification demand reduction control signal to selected CP appliance controller units 1000. Such a pre-notification demand reduction control signal could be provided at any convenient time such that when received by the effected customer, the effected customer becomes aware of the impending demand reduction control signal that will shut off the customer's appliance. Such an embodiment may be particularly advantageous to customers that desire pre-notification to prepare for the shutting down of controlled appliances. For example, a large petroleum processing facility may be operating a plurality of appliances that process crude oil into a variety of refined products. The pre-notification demand reduction control signal provides such a customer sufficient time to perform operations such that when the demand reduction control signal is received, the shutting off of controlled appliances will have a minimal negative impact to the customer.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, the following is claimed:

1. A system which controls appliances comprising:
   at least one appliance controller unit, the appliance controller unit coupled to at least one appliance;
   an energy management controller configured to communicate a demand reduction control signal;
   a site controller configured to receive the demand reduction control signal and configured to communicate a first radio frequency (RF) signal corresponding to the demand reduction signal;
   a first transceiver residing in the appliance controller unit and configured to receive the first radio control signal so that the appliance coupled to the appliance controller unit is shut off upon receipt of the first RF signal;
   a second transceiver coupled to a meter, the meter configured to detect demand, and configured to communicate a second RF signal corresponding to the metered demand to the site controller, wherein the second RF signal is received by the site controller, and wherein information corresponding to the metered demand is communicated by the site controller to the energy management controller.

2. The system of claim 1, further comprising:

a plurality of appliance controller units, each one of the plurality of appliance controller units coupled to at least one of a plurality of appliances; and a plurality of first transceivers residing in one of the plurality of appliance controller units and configured to receive the first RF signal corresponding to the demand reduction control signal generated by the energy management controller so that each of the appliances coupled to the appliance controller units are shut off upon receipt of the first RF signal.

3. The system of claim 2, further comprising:

an appliance controller unit memory residing in each one of the plurality of appliance controller units, the appliance controller unit memory configured to have a unique identification code identifying the appliance controller unit; and an energy management controller memory residing in the energy management controller, the energy management controller memory having a database identifying each one of the plurality of appliance controller units and the associated unique identification code such that the demand reduction control signal generated by the energy management controller is selectively communicated to selected ones of the plurality of appliance controller units.

4. The system of claim 3, further comprising logic residing in the energy management controller memory configured to select at least one unique appliance controller unit identification code such that when the demand reduction control signal is generated the selected ones of the plurality of appliance controller units are identified by the appliance controller unit identification code.

5. The system of claim 1, further comprising:

an appliance controller unit memory residing in each one of the plurality of appliance controller units, the appliance controller unit memory having logic configured to detect the operating status of a plurality of components residing in the appliance controller unit and configured to generate a status report that is transmitted by the first transceiver as a third RF signal to the site controller such that the energy management controller generates a component failure report when the status report indicates failure of at least one component residing in the appliance controller unit.

6. The system of claim 1, wherein the metered demand information communicated as the second RF signal to the energy management controller is used to determine the difference between the metered demand information before generation of the demand reduction control signal and the metered demand information after the demand reduction control signal causes the appliance to be shut off.

7. The system of claim 6, further comprising a means for communicating information to components residing in an energy delivery system control center, the communicating means coupled to the energy management controller, such that operators understand the determined difference between the metered demand information before generation of the demand reduction control signal and the metered demand information after the demand reduction control signal causes the appliance to be shut off.

8. The system of claim 1, further comprising a means for receiving an instruction from components residing in an energy delivery system control center, the instruction receiving means coupled to the energy management controller such that the demand reduction control signal is communicated when the instruction is received.

9. The system of claim 1, further comprising;

an interface coupled to the energy management controller and configured to interface with a communication network such that the generated demand reduction control signal is communicated to the site controller.

10. The system of claim 9, wherein the communication network is a public switched telephone network.

11. The system of claim 9, wherein the communication network is a utility legacy communication system.

12. The system of claim 9, wherein the communication network is a digital communication system.

13. The system of claim 9, wherein the communication network is a radio frequency (RF) communication system.

14. The system of claim 9, wherein the communication network is an Internet network.

15. The system of claim 1, further comprising an appliance controller unit memory residing in the appliance controller unit, the appliance controller unit memory configured to have logic that compares a unique identification code identifying the appliance controller unit with an identification code residing in the first RF signal corresponding to the demand reduction control signal, such that when the appliance controller unit unique identification code corresponds to the demand reduction control signal identification code, the appliance controller unit shuts off the appliance coupled to the appliance controller unit.

16. A method for controlling demand in an energy delivery system, the method comprising the steps of:

generating a demand reduction control signal by an energy management controller;

transmitting a first radio frequency (RF) signal corresponding to the demand reduction control signal generated by the energy management controller to a plurality of first transceivers, one first transceiver residing in one of a plurality of appliance control units, wherein each one of the plurality of appliance control units is coupled to at least one appliance;

shutting off the appliance coupled to the appliance control unit in response to receiving the first RF signal;

metering a first change in demand at a plurality of meters, each one of the meters coupled to one of the appliances;

transmitting plurality of second RF signals each corresponding to one of the plurality of first changes of demand to the energy management controller from a plurality of second transceivers, each one of the second transceivers coupled to one of the plurality of meters; and determining a first aggregate change in demand, the first aggregate change in demand equaling a sum of the plurality of first changes in demand.

17. The method of claim 16, further comprising the steps of:

assigning a unique identification code to each one of the plurality of appliance control units;

selecting a plurality of identification codes such that selected ones of the plurality of appliance control units are selected; and receiving the first RF signal corresponding to the generated demand reduction control signal by the selected ones of the plurality of appliance control units perform the step of shutting off each one of the appliances coupled to the selected ones of the plurality of appliance control units.

18. The method of claim 16, further comprising the step of communicating the demand reduction control signal through a communication network from the energy management controller to a site controller such that the site controller transmits the first RF signal to the at least one of a the plurality of appliance control units.

19. The method of claim 18, wherein the communication network is a public switched telephone network.

20. The method of claim 18, wherein the communication network is a utility legacy communication system.

21. The method of claim 18, wherein the communication network is a digital communication system.

22. The method of claim 18, wherein the communication network is a radio frequency (RF) communication system.

23. The method of claim 18, wherein the communication network is an Internet network.

24. The method of claim 16, further comprising the step of receiving by the energy management controller a demand reduction instruction from operators of the energy delivery system such that the step of generating the demand reduction control signal is made in response to the received demand reduction instruction.

25. The method of claim 16, further comprising the steps of:
determining a difference between the determined first aggregate change in demand with a demand reduction instruction specifying a desired amount of demand reduction;
generating a second demand reduction control signal;
transmitting a third RF signal corresponding to the second demand reduction control signal to a plurality of third transceivers, wherein each one of the third transceivers resides in one of a second plurality of appliance control units, and wherein each one of the second plurality of appliance control units is coupled to at least one appliance;
shutting off at least one of the appliances coupled to the second plurality of appliance control units in response to receiving the third RF signal;
metering a second change in demand at a second plurality of meters;
transmitting a plurality of fourth RF signals each corresponding to one of the plurality of second changes of demand to the energy management controller from a plurality of fourth transceivers, each one of the fourth transceivers coupled to one of the plurality of second meters; and
determining a second aggregate change in demand, the second aggregate change in demand equaling the sum of the plurality of second changes in demand.

26. The method of claim 25, further comprising the step of selecting a number of appliance control units to be members of the second plurality of appliance control units such that the second aggregate change in demand substantially equals the difference between the first aggregate change in demand and the desired amount of demand reduction.

27. The method of claim 16, further comprising the steps of:
selecting at least one of the plurality of appliance control units; and
transmitting the first radio frequency (RF) signal corresponding to the generated demand reduction control signal to the selected appliance control units such that the appliances coupled to the selected appliance control units are shut off.

28. The method of claim 16, further comprising the steps of:
generating a terminating signal; and
transmitting a third RF signal corresponding to the terminating signal from the energy management controller to the plurality of appliance control units such that the demand reduction control signal is ended.

29. The method of claim 28, further comprising the steps of:
metering a second change in demand at each one of the plurality of meters after receiving the third RF signal; and
determining a second aggregate change in demand, the second aggregate change in demand equaling a second sum of the plurality of second changes in demand.

30. The method of claim 29, further comprising the steps of:
selecting a number of appliance control units to be members of a second plurality of appliance control units;
generating a second demand reduction control signal;
transmitting the second demand reduction control signal to the second plurality of appliance control units, each one of the second plurality of appliance control units coupled to at least one appliance; and
shutting off each one of the appliances coupled to the second plurality of appliance control units in response to receiving the second demand reduction control signal such that a third aggregate change in demand substantiallly equals a difference between the second aggregate change of demand and the aggregate metered demand determined before the demand reduction control signal is ended.

31. The method of claim 16, further comprising the steps of:
assigning a unique identification code to each one of the plurality of appliance control units;
selecting a plurality of identification codes to define a first demand reduction load block; and
associating the selected identification codes with the generated demand reduction control signal such that when the demand reduction control signal is transmitted, only the appliance control units having their identification code selected perform the step of shutting off at least one of the appliances coupled to the appliance control unit.

32. The method of claim 31, further comprising the steps of:
defining a load block identification code such that the load block identification code corresponds to the selected unique identification codes; and
associating the load block identification code with the generated demand reduction control signal such that when the demand reduction control signal is transmitted, only the appliance control units having their identification code associated with the load block identification code perform the step of shutting off each one of the appliances coupled to the appliance control unit.

33. The method of claim 32, further comprising the steps of:
defining a plurality of load block identification codes, each one of the load block identification codes corresponding to the selected unique group of identification codes, such that a plurality of demand reduction load blocks are defined;

estimating an aggregate amount of demand reduction for each of the plurality of demand reduction load blocks;

receiving a demand reduction instruction specifying an amount of a desired aggregate demand reduction; and selecting at least one of the plurality of demand reduction load blocks such that the estimated amount of demand reduction for the selected demand reduction load blocks approximately equals the amount of the desired aggregate demand reduction, wherein the generated demand reduction control signal corresponds to the selected demand reduction load blocks.

34. The method of claim 33, further comprising the steps of:

determining a difference between the first aggregate change in demand and the amount of the desired aggregate demand reduction;

selecting at least one second demand reduction load block such that the sum of the estimated aggregate amount of demand reduction associated with the selected second demand reduction load block substantially equals the determined difference; and generating a second demand reduction control signal such that when the second demand reduction control signal is transmitted, only the appliance control units having their identification code associated with the second demand reduction load block perform the step of shutting off each one of the appliances coupled to the appliance control unit.

35. The method of claim 16, further comprising the steps of:

generating an acknowledgment RF signal from each one of the transceivers residing in the appliance control units that successfully shut off its respective appliance; and communicating the acknowledgement RF signal to the energy management controller.

36. The method of claim 16, further comprising the steps of;

indicating failure of at least one component residing in one of the plurality of appliance control units by generating a status RF signal that is transmitted from the transceiver residing in the appliance control unit to the energy management controller; and requesting maintenance for the failed component.

37. The method of claim 36, further comprising the step of generating a status request signal by the energy management controller, such that when the status request RF signal is received by the plurality of appliance control units, the step of indicating failure of at least one component is initiated.

38. The method of claim 16, further comprising the steps of:

generating a notification control signal by the energy management controller, the generation of the notification control signal occurring before the step of generating the demand reduction control signal by a predefined amount of time;

transmitting a RF notification control signal corresponding to the notification control signal to a selected one of the first transceivers;

receiving the RF notification control signal by the selected first transceiver; and generating a notification communication signal by the at least one appliance control unit in which the selected first transceiver resides, such that a customer understands that the step of shutting off the appliance will occur at a future time, the future time substantially corresponding to the predefined amount of time.

39. A system for controlling demand in an energy delivery system, comprising:

means for generating a demand reduction control signal by an energy management controller;

means for transmitting a first radio frequency (RF) signal corresponding to the demand reduction control signal generated by the energy management controller to a plurality of first transceivers, one first transceiver residing in one of a plurality of appliance control units, wherein each one of the plurality of appliance control units is coupled to at least one appliance;

means for shutting off the appliance coupled to the appliance control unit in response to receiving the first RF signal;

means for metering a first change in demand at a plurality of meters, each one of the meters coupled to one of the appliances;

transmitting a plurality of second RF signals each corresponding to one of the plurality of first changes of demand to the energy management controller from a plurality of second transceivers, each one of the second transceivers coupled to one of the plurality of meters; and means for determining a first aggregate change in demand, the first aggregate change in demand equaling a sum of the plurality of first changes in demand.

40. The system of claim 39, further comprising:

means for assigning a unique identification code to each one of the plurality of appliance control units;

means for selecting a plurality of identification codes such that selected ones of the plurality of appliance control units are selected; and means for receiving the first RF signal corresponding to the generated demand reduction control signal by the selected ones of the plurality of appliance control units perform the step of shutting off each one of the appliances coupled to the selected ones of the plurality of appliance control units.

41. The system of claim 39, further comprising means for communicating the demand reduction control signal through a communication network from the energy management controller to a site controller such that the site controller transmits the first RF signal to the at least one of the plurality of appliance control units.

42. The system of claim 39, further comprising means for receiving by the energy management controller a demand reduction instruction from operators of an energy delivery system such that the step of generating the demand reduction control signal is made in response to the received demand reduction instruction.

43. The system of claim 39, further comprising:

means for receiving a demand reduction instruction, the demand reduction instruction having at least a requested amount of demand reduction;

means for determining a difference between the determined first aggregate change in demand with the requested amount of demand reduction;

means for generating a second demand reduction control signal;

means for transmitting a third RF signal corresponding to the second demand reduction control signal to a plurality of third transceivers, wherein each one of the third transceivers resides in one of second plurality of appliance control units, and wherein each one of the second plurality of appliance control units is coupled to at least one appliance;

means for shutting off at least one of the appliances coupled to the second plurality of appliance control units in response to receiving the third RF signal;

means for metering a second change in demand at a second plurality of meters;

means for transmitting a plurality of fourth RF signals corresponding to one of the plurality of second changes of demand to the energy management controller from a plurality of fourth transceivers, each one of the fourth transceivers coupled to one of the plurality of second meters; and means for determining a second aggregate change in demand, the second aggregate change in demand equaling the sum of the plurality of second changes in demand.

44. The system of claim 43, further comprising means for selecting a number of appliance control units to be members of the second plurality of appliance control units such that the second aggregate change in demand substantially equals the difference between the first aggregate change in demand and the demand reduction instruction selecting the number of appliance control units to be members of the second plurality of appliance control units such that the second aggregate change in demand substantially equals the difference between the first aggregate change in demand and the requested amount of demand reduction.

45. The system of claim 39, further comprising:

means for selecting at least one of the plurality of appliance control units; and means for transmitting the first radio frequency (RF) signal corresponding to the generated demand reduction control signal to the selected appliance control units such that the appliances coupled to the selected appliance control units are shut off.

46. The system of claim 39, further comprising:

means for generating a terminating signal; and means for transmitting a third RF signal corresponding to the terminating signal from the energy management controller to the plurality of appliance control units such that the demand reduction control signal is ended.

47. The system of claim 46, further comprising:

means for metering a second change in demand at each one of the plurality of meters after the demand reduction control signal is ended;

means for determining a second aggregate change in demand, the second aggregate change in demand equaling the sum of the metered second change in demand at each one of the plurality of meters; and means for comparing the second aggregate change of demand with an aggregate metered demand determined before the demand reduction control signal is ended.

48. The system of claim 47, further comprising:

means for selecting a number of appliance control units to be members of a second plurality of appliance control units;

means for generating a second demand reduction control signal;

means for transmitting the second demand reduction control signal to the second plurality of appliance control units, each one of the second plurality of appliance control units coupled to at least one appliance; and means for shutting off each one of the appliances coupled to the second plurality of appliance control units in response to receiving the second demand reduction control signal such that a third aggregate change in demand substantially equals the difference between the second aggregate change of demand and the aggregate metered demand determined before the demand reduction control signal is ended.

49. The system of claim 39, further comprising:

means for assigning a unique identification code to each one of the plurality of appliance control units;

means for selecting a plurality of identification codes to define a first demand reduction load block; and means for associating the selected identification codes with the generated demand reduction control signal such that when the demand reduction control signal is transmitted, only the appliance control units having their identification code selected perform the step of shutting off at least one of the appliances coupled to the appliance control unit.

50. The system of claim 49, further comprising:

means for defining a load block identification code such that the load block identification code corresponds to the selected unique identification codes; and means for associating the load block identification code with the generated demand reduction control signal such that when the demand reduction control signal is transmitted, only the appliance control units having their identification code associated with the load block identification code perform the step of shutting off each one of the appliances coupled to the appliance control unit.

51. The system of claim 50, further comprising:

means for defining a plurality of load block identification codes, each one of the load block identification codes corresponding to the selected unique group of identification codes, such that a plurality of demand reduction load blocks are defined;

means for estimating an aggregate amount of demand reduction for each of the plurality of demand reduction load blocks;

means for receiving a demand reduction instruction specifying an amount of a desired aggregate demand reduction; and means for selecting at least one of the plurality of demand reduction load blocks such that the estimated aggregate amount of demand reduction for the selected demand reduction load blocks approximately equals the amount of the desired aggregate demand reduction specified by the demand reduction control signal.

52. The system of claim 51, further comprising:

means for metering an aggregate change in demand after the demand reduction control signal is transmitted to the plurality of appliance control units;

means for determining a difference between the aggregate metered demand change and the amount of the desired aggregate demand reduction;

means for selecting at least one second demand reduction load block such that the sum of the estimated aggregate amount of demand reduction associated with the selected second demand reduction load block substantially equals the determined difference; and means for generating a second demand reduction control signal such that when the second demand reduction control signal is transmitted, only the appliance control units having their identification code associated with the second demand reduction load block perform the step of shutting off each one of the appliances coupled to the appliance control unit.

53. The system of claim 39, further comprising:

means for generating an acknowledgment RF signal from each one of the transceivers residing in the appliance control units that successfully shut off its respective appliance; and means for communicating the acknowledgement RF signal to the energy management controller.

54. The system of claim 39, further comprising:

means for indicating failure of at least one component residing in one of the plurality of appliance control units by generating a status RF signal that is transmitted from the transceiver residing in the appliance control unit to the energy management controller; and means for requesting maintenance for the failed component.

55. The system of claim 54, further comprising means for generating a status request signal by the energy management controller, such that when the status request RF signal is received by the plurality of appliance control units, the step of indicating failure of at least one component is initiated.

56. The system of claim 39, further comprising:

means for generating a notification control signal by the energy management controller, the generation of the notification control signal occurring before the demand reduction control signal is generated by a predefined amount of time;

means for transmitting a RF notification control signal corresponding to the notification control signal from the energy management controller to a selected one of the first transceivers;

means for receiving the RF notification control signal by the selected first transceiver; and means for generating a notification communication signal by the at least one appliance control unit in which the selected first transceiver resides, such that a customer understands that the appliance will be shut off at a future time, the future time substantially corresponding to the predefined amount of time.

57. A method for controlling demand in an energy delivery system, the method comprising the steps of:

generating a demand reduction control signal by an energy management controller;

transmitting the demand reduction control signal from the energy management controller to a site controller;

communicating a first radio frequency (RF) signal from the site controller to a transceiver network comprising a plurality of network transceivers, the first RF signal having a first identification code corresponding to a plurality of transceivers;

communicating the first RF signal through the transceiver network to the plurality of transceivers residing in the appliance controller unit;

receiving the first RF signal by each of the plurality of transceivers, each transceiver residing in one of a plurality of appliance controller units, each appliance controller unit coupled to at least one appliance and configured to shut off the appliance coupled to the appliance control unit in response to its corresponding transceiver receiving the first RF signal;

detecting a first metered change in demand at each of a plurality of meters, each of the meters coupled to at least one of the appliances;

communicating a plurality of second RF signals to the transceiver network from a plurality of second transceivers, each one of the second transceivers uniquely coupled to one of the plurality of meters, and each of the second RF signals uniquely corresponding to the first metered change in demand at its respective meter;

receiving the plurality of second RF signals at the site controller;

communicating the plurality of second RF signals from the site controller to the energy management controller; and determining a first aggregate change in demand, the first aggregate change in demand equaling a sum of the first metered change in demand in the plurality of second RF signals.

58. The method of claim 57, further comprising the step of communicating the demand reduction control signal from the energy management controller to the site controller through a communication network.

59. The method of claim 58, wherein the communication network is a public switched telephone network.

60. The method of claim 58, wherein the communication network is a utility legacy communication system.

61. The method of claim 58, wherein the communication network is a digital communication system.

62. The method of claim 58, wherein the communication network is a radio frequency (RF) communication system.

63. The method of claim 58, wherein the communication network is an Internet network.

64. The method of claim 57, further comprising the step of receiving by the energy management controller a demand reduction instruction from operators of an energy delivery system such that the step of generating the demand reduction control signal is made in response to the received demand reduction instruction.

65. The method of claim 57, further comprising the steps of:

receiving a demand reduction instruction, the demand reduction instruction having at least a requested amount of demand reduction;

determining a difference between the determined first aggregate change in demand with the requested amount of demand reduction;

generating a second demand reduction control signal;

transmitting the second demand reduction control signal to the site controller;

communicating a third RF signal from the site controller through the transceiver network, the third RF signal having a second identification code corresponding to a plurality of third transceivers residing in a second plurality of appliance control units, each one of the second plurality of appliance control units coupled to at least one second appliance so that the second appliances coupled to the second plurality of appliance control units are shut off in response to its corresponding third transceiver receiving the second RF signal;

detecting a second metered change in demand at each of a plurality of second meters, each of the second meters coupled to at least one of the second appliances;

communicating a plurality of fourth RF signals to the transceiver network from a plurality of fourth transceivers, each one of the fourth transceivers uniquely coupled to one of the plurality of second meters, and each of the fourth RF signals uniquely corresponding to the second metered change in demand at its respective second meter;

receiving the plurality of fourth RF signals at the site controller;

communicating the plurality of fourth RF signals from the site controller to the energy management controller; and determining a second aggregate change in demand, the second aggregate change in demand equaling the sum of the second metered change in demand in the plurality of fourth RF signals.

66. The method of claim 65, further comprising the step of selecting a number of appliance control units to be members of the second plurality of appliance control units such that the second aggregate change in demand substantially equals the difference between the first aggregate change in demand and the requested amount of demand reduction.

67. The method of claim 57, further comprising the steps of:

generating a terminating signal; and transmitting a terminating RF signal corresponding to the terminating signal to the plurality of transceivers such that the demand reduction control signal is ended.

68. The method of claim 57, further comprising the steps of:

assigning a unique identification code to each one of the plurality of appliance control units;

selecting a plurality of identification codes to define a first demand reduction load block; and associating the selected identification codes with the generated demand reduction control signal such that when the demand reduction control signal is transmitted, only the appliance control units having their identification code selected shut off the appliance coupled to the appliance control unit.

69. The method of claim 68, further comprising the steps of:

defining a load block identification code such that the load block identification code corresponds to the selected unique identification codes; and associating the load block identification code with the generated demand reduction control signal such that the when the demand reduction control signal is transmitted, only the appliance control units having their identification code associated with the load block identification code shut off the appliance coupled to the appliance control unit.

70. The method of claim 69, further comprising the steps of:

defining a plurality of load block identification codes, each one of the load block identification codes corresponding to the selected unique group of identification codes, such that a plurality of demand reduction load blocks are defined;

estimating an aggregate amount of demand reduction for each of the plurality of demand reduction load blocks; and selecting at least one of the plurality of demand reduction load blocks such that an estimated amount of demand reduction for the selected demand reduction load blocks approximately equals a desired aggregate demand reduction specified by the demand reduction control signal.

71. The method of claim 57, further comprising the steps of:

generating an acknowledgment RF signal from each one of the transceivers residing in the appliance control units that successfully shut off its respective appliance; and communicating the acknowledgment RF signal to the energy management controller through the transceiver network.

72. The method of claim 57, further comprising the steps of:

generating a status RF signal generated by one of the transceivers residing in the plurality of appliance control units, the status RF signal indicating failure of at least one component residing in the appliance control unit; and communicating the status RF signal to the energy management controller through the transceiver network thereby requesting maintenance for the failed component.

73. The method of claim 72, further comprising the steps of:

generating a status request signal by the energy management controller;

communicating the status request signal to the site controller;

communicating a status request RF signal from the site controller through the transceiver network to at least one of the transceivers, the status request RF signal corresponding to the status request signal;

generating a return status request RF signal indicating the status of the appliance control unit; and communicating the return status request signal to the energy management controller through the transceiver network, the site controller, and the communication network.

74. The method of claim 57, further comprising the steps of:

generating a notification control signal by the energy management controller, the generation of the notification control signal occurring before the step of generating the demand reduction control signal by a predefined amount of time; and transmitting a RF notification control signal corresponding to the notification control signal from the energy management controller to a selected one of the transceivers, such that when the notification control signal is received by the at least one appliance control unit in which the transceiver resides, a customer understands that the step of shutting off the appliance will occur at a future time, the future time substantially corresponding to the predefined amount of time.

75. A system for controlling demand in an energy delivery system comprising:

means for generating a demand reduction control signal by an energy management controller;

means for transmitting the demand reduction control signal from the energy management controller to a site controller;

means for communicating a first radio frequency (RF) signal from the site controller to a transceiver network comprising a plurality of network transceivers, the first RF signal having a first identification code corresponding to a plurality of transceivers;

means for communicating the first RF signal through the transceiver network to the plurality of transceivers residing in the appliance controller unit;

means for receiving the first RF signal by each of the plurality of transceivers, each transceiver residing in one of a plurality of appliance controller units, each appliance controller unit coupled to at least one appliance and configured to shut off the appliance coupled to the appliance control unit in response to its corresponding transceiver receiving the first RF signal corresponding to the demand reduction control signal;

means for detecting a first metered change in demand at each of a plurality of meters, each of the meters coupled to at least one of the appliances;

means for communicating a plurality of second RF signals to the transceiver network from a plurality of second transceivers, each one of the second transceivers uniquely coupled to one of the plurality of meters, and each of the second RF signals uniquely corresponding to the first metered change in demand at its respective meter;

means for receiving the plurality of second RF signals at the site controller;

means for communicating the plurality of second RF signals from the site controller to the energy management controller; and means for determining a first aggregate change in demand, the first aggregate change in demand equaling a sum of the first metered change in demand of the plurality of second RF signals.

76. The system of claim 75, further comprising means for communicating the demand reduction control signal from the energy management controller to the site controller through a communication network.

77. The system of claim 76, wherein the communication network is a public switched telephone network.

78. The system of claim 76, wherein the communication network is a utility legacy communication system.

79. The system of claim 76, wherein the communication network is a digital communication system.

80. The system of claim 76, wherein the communication network is a radio frequency (RF) communication system.

81. The system of claim 76, wherein the communication network is an Internet network.

82. The system of claim 75, further comprising means for receiving by the energy management controller a demand reduction instruction from operators of an energy delivery system such that the step of generating the demand reduction control signal is made in response to the received demand reduction instruction.

83. The system of claim 75, further comprising:

means for receiving a demand reduction instruction, the demand reduction instruction having at least a requested amount of demand reduction;

means for determining a difference between the determined first aggregate change in demand with the requested amount of demand reduction;

means for generating a second demand reduction control signal;

means for transmitting the second demand reduction control signal to the site controller;

means for communicating a third RF signal from the site controller through the transceiver network, the third RF signal having a second identification code corresponding to a plurality of third transceivers residing in a second plurality of appliance control units, each one of the second plurality of appliance control units coupled to at least one second appliance so that the second appliances coupled to the second plurality of appliance control units are shut off in response to its corresponding third transceiver receiving the second RF signal;

means for detecting a second metered change in demand at each of a plurality of second meters, each of the second meters coupled to at least one of the second appliances;

means for communicating a plurality of fourth RF signals to the transceiver network from a plurality of fourth transceivers, each one of the fourth transceivers uniquely coupled to one of the plurality of second meters, and each of the fourth RF signals uniquely corresponding to the second metered change in demand at its respective second meter;

means for receiving the plurality of fourth RF signals at the site controller;

means for communicating the plurality of fourth RF signals from the site controller to the energy management controller; and means for determining a second aggregate change in demand, the second aggregate change in demand equaling the sum of the second metered change in demand in the plurality of fourth RF signals.

84. The system of claim 83, further comprising means for selecting a number of appliance control units to be members of the second plurality of appliance control units such that the second aggregate change in demand substantially equals the difference between the first aggregate change in demand and the requested amount of demand reduction.

85. The system of claim 75, further comprising:

means for generating a terminating signal; and means for transmitting a terminating RF signal corresponding to the terminating signal to the plurality of transceivers such that the demand reduction control signal is ended.

86. The system of claim 75, further comprising:

means for assigning a unique identification code to each one of the plurality of appliance control units;

means for selecting a plurality of identification codes to define a first demand reduction load block; and means for associating the selected identification codes with the generated demand reduction control signal such that when the demand reduction control signal is transmitted, only the appliance control units having their identification code selected shut off the appliance coupled to the appliance control unit.

87. The system of claim 86, further comprising:

means for defining a load block identification code such that the load block identification code corresponds to the selected unique identification codes; and means for associating the load block identification code with the generated demand reduction control signal such that when the demand reduction control signal is transmitted, only the appliance control units having their identification code associated with the load block identification code shut off the appliance coupled to the appliance control unit.

88. The system of claim 87, further comprising:

means for defining a plurality of load block identification codes, each one of the load block identification codes corresponding to the selected unique group of identification codes, such that a plurality of demand reduction load blocks are defined;

means for estimating an aggregate amount of demand reduction for each of the plurality of demand reduction load blocks; and means for selecting at least one of the plurality of demand reduction load blocks such that an estimated amount of demand reduction for the selected demand reduction load blocks approximately equals a desired aggregate demand reduction specified by the demand reduction control signal.

89. The system of claim 75, further comprising:

means for generating an acknowledgment RF signal from each one of the transceivers residing in the appliance control units that successfully shut off its respective appliance; and means for communicating the acknowledgment RF signal to the energy management controller through the transceiver network.

90. The system of claim 75, further comprising:

means for generating a status RF signal generated by one of the transceivers residing in the plurality of appliance control units, the status RF signal indicating failure of at least one component residing in the appliance control unit; and means for communicating the status RF signal to the energy management controller through the transceiver network thereby requesting maintenance for the failed component.

91. The system of claim 90, further comprising;

means for communicating a status request signal generated by the energy management controller to the site controller; and means for communicating a status request RF signal from the site controller through the transceiver network to at least one of the transceivers the status request RF signal corresponding to the status request signal;

means for generating a return status request RF signal indicating the status of the appliance control unit; and means for communicating the return status request signal to the energy management controller through the transceiver network, the site controller, and the communication network.

92. The system of claim 75, further comprising:

means for generating a notification control signal by the energy management controller, the generation of the notification control signal occurring before the step of generating the demand reduction control signal by a predefined amount of time; and means for transmitting a RF notification control signal corresponding to the notification control signal from the energy management controller to a selected one of the transceivers such that when the notification control signal is received by the at least one appliance control unit in which the transceiver resides, a customer understands that the step of shutting off the appliance will occur at a future time, the future time substantially corresponding to the predefined amount of time.

93. The method of claim 29, further comprising the step of comparing the second aggregate change in demand with an aggregate metered demand determined before the terminating signal is generated.

* * * * *